(12) United States Patent
Ostby et al.

(10) Patent No.: US 10,877,545 B2
(45) Date of Patent: Dec. 29, 2020

(54) ENERGY MANAGEMENT IN GRAPHICS PROCESSING UNITS

(71) Applicant: Arm Limited, Cambridge (GB)

(72) Inventors: Kenneth Edvard Ostby, Cambridge (GB); Andrew Burdass, Ely (GB)

(73) Assignee: Arm Limited, Cambridge (GB)

( * ) Notice: Subject to any disclaimer, the term of this patent is extended or adjusted under 35 U.S.C. 154(b) by 7 days.

(21) Appl. No.: 16/137,537

(22) Filed: Sep. 20, 2018

(65) Prior Publication Data

US 2020/0097061 A1   Mar. 26, 2020

(51) Int. Cl.
*G06T 1/00* (2006.01)
*G06F 1/3228* (2019.01)
*G06F 9/38* (2018.01)
*G06T 1/20* (2006.01)

(52) U.S. Cl.
CPC .......... *G06F 1/3228* (2013.01); *G06F 9/3836* (2013.01); *G06T 1/20* (2013.01)

(58) Field of Classification Search
CPC .............. G06F 1/3206; G06F 11/3062; G06F 11/3466; G06F 1/26; G06F 1/32; G06F 1/3243; G06F 1/329
See application file for complete search history.

(56) References Cited

U.S. PATENT DOCUMENTS

| | | | |
|---|---|---|---|
| 2007/0049134 A1* | 3/2007 | Conroy | G06F 1/26 439/894 |
| 2013/0111191 A1* | 5/2013 | Murray | G06F 9/384 712/214 |
| 2015/0317764 A1* | 11/2015 | Govindaraju | G06F 1/324 345/522 |

* cited by examiner

*Primary Examiner* — Hau H Nguyen
(74) *Attorney, Agent, or Firm* — Vierra Magen Marcus LLP

(57) ABSTRACT

A graphics processing unit is operable to execute graphics processing programs comprising sequences of instructions to perform graphics processing operations. The graphics processing unit includes execution processing circuitry operable to execute instructions to perform graphics processing operations and instruction issuing circuitry operable to issue instructions to be executed to the execution processing circuitry. The graphics processing unit also includes energy management circuitry operable to monitor the energy usage by the execution processing circuitry when executing instructions, determine, based on the monitoring of the energy usage, a permitted energy usage range for the execution processing circuitry when executing instructions for a future time period, and control the issuing of instructions to the execution processing circuitry by the instruction issuing circuitry during the future time period based on the permitted energy usage range determined for the future time period.

19 Claims, 11 Drawing Sheets

ENERGY MANAGEMENT IN GRAPHICS PROCESSING UNITS

BACKGROUND

The technology described herein relates to graphics processors (graphics processing units) and in particular to the management of energy usage in a graphics processing unit.

Graphics processing is typically carried out in a pipelined fashion, with one or more pipeline stages operating on the data to generate the final render output, e.g. frame that is displayed. Many graphics processing pipelines implemented by graphics processors now include one or more programmable processing stages, commonly referred to as "shaders". For example, a graphics processing pipeline may include one or more of, and typically all of: a geometry shader, a vertex shader, and a fragment (pixel) shader. These shaders are programmable processing stages that execute shader programs on input data values to generate a desire set of output data, for example appropriately shaded and rendered fragment data in the case of a fragment shader, for processing by the rest of the graphics pipeline and/or for output. The shaders of the graphics processing pipeline may share programmable processing circuitry of the graphics processor, or they may each be executed by distinct programmable processing units.

A graphics processing unit (GPU) shader core is thus a processing unit that performs graphics processing by running small programs for each graphics "work" item in a graphics output, such as a render target, e.g. frame, to be generated (an "item" in this regard is usually a vertex or a sampling position (e.g. in the case of a fragment shader)). This generally enables a high degree of parallelism, in that a typical render output, e.g. frame, features a rather large number of vertices and fragments, each of which can be processed independently.

In graphics shader operation, each work "item" will be processed by means of an execution thread which will execute the instructions of the shader program in question for the graphics work "item" in question.

Shader program execution efficiency may be improved by grouping execution threads (where each thread corresponds, e.g., to one vertex or one sampling position) into "groups" or "bundles" of threads, where the threads of one group are run in lockstep, one instruction at a time. In this way, it is possible to share instruction fetch and scheduling resources between all the threads in the group. Other terms used for such thread groups include "warps" and "wave fronts".

The Applicants have recognised that the execution of shader programs can be a significant source of energy usage in GPUs. The Applicants have also appreciated that a GPU's energy usage may change rapidly during the execution of shader programs, e.g. owing to variations in the number of instructions which are being executed at any one time.

The Applicants have further recognised that the relative rapid changes in the energy usage, both increases and decreases, can cause problems owing to the required changes in current over a short period of time when ramping the power up or down. It is therefore desirable to smooth out the energy usage over time, to avoid exposing the GPU to undesirably large and rapid power changes during the execution of shader programs. However, existing power management units and techniques struggle to do this, at least in a way that able to be configured on the GPU itself.

The Applicants accordingly believe that there remains scope for improved energy management in graphics processing units.

BRIEF DESCRIPTION OF THE DRAWINGS

A number of embodiments of the technology described herein will now be described by way of example only and with reference to the accompanying drawings, in which.

DETAILED DESCRIPTION

Figure 1:
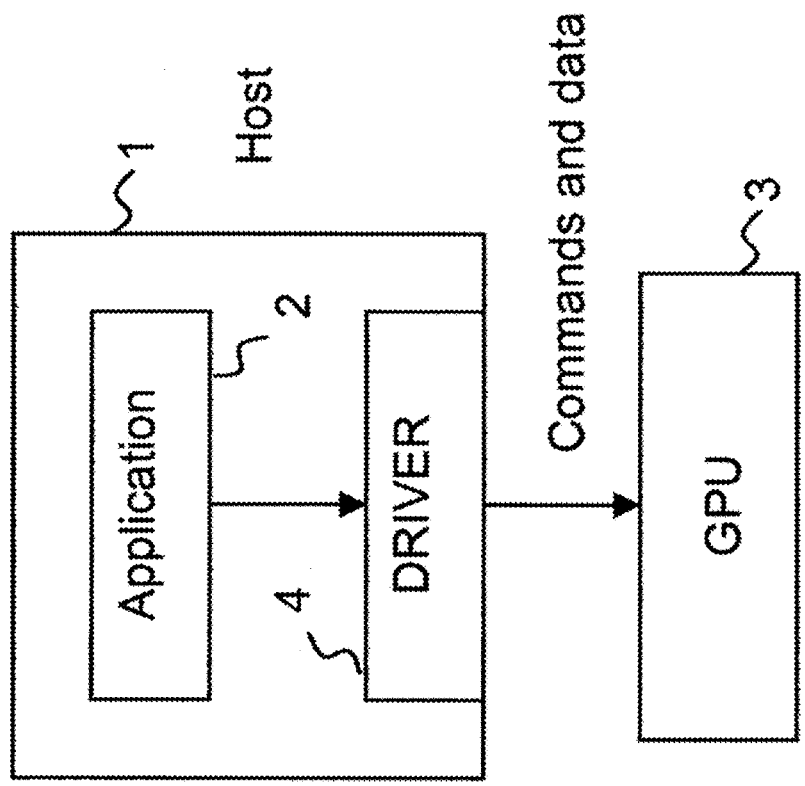
FIG. 1 shows schematically an exemplary computer graphics processing system.

One embodiment of the technology described herein comprises a graphics processing unit operable to execute graphics processing programs comprising sequences of instructions to perform graphics processing operations;

the graphics processing unit comprising:
  execution processing circuitry operable to execute instructions to perform graphics processing operations;
  instruction issuing circuitry operable to issue instructions to be executed to the execution processing circuitry; and
  energy management circuitry operable to:
    monitor the energy usage by the execution processing circuitry when executing instructions;
    determine, based on the monitoring of the energy usage, a permitted energy usage range for the execution processing circuitry when executing instructions for a future time period; and
    control the issuing of instructions to the execution processing circuitry by the instruction issuing circuitry during the future time period based on the permitted energy usage range determined for the future time period.

Another embodiment of the technology described herein comprises a method of operating a graphics processing unit for executing graphics processing programs comprising sequences of instructions to perform graphics processing operations;

wherein the graphics processing unit execution comprises
processing circuitry operable to execute instructions to
perform graphics processing operations;
wherein the method comprises:
issuing instructions to be executed to the execution
processing circuitry;
monitoring the energy usage by the execution processing circuitry when executing the instructions;
determining, based on the monitoring of the energy usage, a permitted energy usage range for the execution processing circuitry when executing instructions for a future time period; and
controlling the issuing of instructions to the execution processing circuitry during the future time period based on the permitted energy usage range determined for the future time period.

The technology described herein relates to a graphics processing unit and a method of operating a graphics processing unit that executes instructions for graphics processing (e.g. shader) programs to perform graphics processing operations. The graphics processing unit includes execution processing circuitry, instruction issuing circuitry and energy management circuitry. The instruction issuing circuitry issues instructions to the execution processing circuitry for execution and the energy management circuitry monitors the energy usage (consumption of energy, also referred to as "power usage" or "power consumption") by the execution processing circuitry when executing instructions.

The monitored energy usage is used to set a permitted energy usage range for a future (e.g. next) time period. In turn, this energy usage range is used by the energy management circuitry to control the issuing of instructions by the instruction issuing circuitry in the future (e.g. next) time period.

Thus it will be seen that the monitored energy usage for instructions being executed by the execution processing circuitry is used to control the issuing of instructions (and hence the energy usage) in the future. This control is effected by the energy management circuitry of the graphics processing unit (i.e. an internal mechanism of the graphics processing unit), in a way, for example, that is configurable and does not depend on an external mechanism, such as a more expensive power management integrated circuit (PMIC).

By setting a permitted range for the future energy usage, and using this to control the (e.g. number of) instructions issued by the instruction issuing circuitry to the execution processing circuitry in the future time period, the energy usage as a result of executing the instructions issued in the future time is expected to be kept within the determined permitted energy usage range. This facilitates controlling the energy usage in the future time period is controlled (e.g. to) not change (e.g. increase or decrease) by more than a permitted (relative) amount.

Constraining the changes in energy usage over time, e.g. to within a permitted range, helps to reduce the size of the changes in energy usage which have been seen to cause problems in conventional graphics processors. It also allows the graphics processing unit to more smoothly ramp its power consumption up and down, providing more certainty for the energy management of the graphics processing unit.

In turn, this may allow the (clock) frequency of the graphics processing unit to be increased and/or the voltage to be decreased, leading to an increased operating frequency and/or a decreased power or energy consumption, both of which help to increase the efficiency of the graphics processing unit. This is in contrast, for example, to using techniques such as voltage and frequency scaling to mitigate the impact of large variations in the number of tasks being submitted to a graphics processor for execution, which will have a negative effect on computational efficiency. The technology described herein helps to avoid this and thus comprises a more efficient graphics processing unit.

The energy usage of the execution processing circuitry when executing instructions may be monitored in any suitable and desired way. The energy usage may be measured or determined directly, e.g. by measuring the current and/or the voltage used by the execution processing circuitry when executing instructions.

In an embodiment the energy usage is monitored by monitoring (e.g. counting) the (e.g. number of) issuing of instructions (by the instruction issuing circuitry) to the execution processing circuitry. By monitoring the instructions issued to the execution processing circuitry, this can give an indication or measure of the energy usage and, e.g., from which the energy usage can be estimated.

In one embodiment the energy management circuitry simply counts the number of instructions issued to the execution processing circuitry for execution to monitor the energy usage by the execution processing circuitry, e.g. assuming that all the instructions cause (e.g. approximately) the same (or have a known, constant average) energy usage when executed.

However, in an embodiment, the (e.g. known) energy usage for each (e.g. different type of) instruction is used to monitor the overall energy usage of the execution processing circuitry when executing the instructions. Thus, in an embodiment, the energy usage is monitored by monitoring the issuing of instructions to the execution processing circuitry and weighting the instructions issued by their (e.g. relative) energy usage. In an embodiment the weights are coefficients that are set as a function of the (e.g. known) energy usage for the respective (e.g. different types of) instructions (for the graphics processing units in questions).

For example, the energy usage, $W_{cost}$, for a set of instructions, i, may be calculated by $W_{cost}=\Sigma_i T_i$ where $T_i$ is the weight (coefficient) for each instruction that is issued to the execution processing circuitry.

In an embodiment, the (e.g. relative) energy usage for each (e.g. different type of) instruction is determined prior to the execution of the instructions and thus, in an embodiment, known when the instructions are executed by the execution processing circuitry and the energy usage is monitored. In an embodiment the (e.g. known) energy usage (e.g. weighting) for each (e.g. different type of) instruction is stored (e.g. in a lookup table) for use by the energy management circuitry when monitoring the energy usage. For example, when a particular type of instruction is issued by the instruction issuing circuitry to the execution processing circuitry, the energy management circuitry can then lookup the reference energy usage (e.g. weighting) for that type of instruction and use the stored value to determine the contribution of the instruction to the overall energy usage when monitoring the energy usage.

As an example, integer operations such as XOR, integer addition, etc., typically use less energy than floating point arithmetic such as floating point addition, floating point multiplication, etc. Different reference energy usages (e.g. weightings) may therefore be assigned to these different types of instructions, as appropriate, to reflect their different energy usages.

It should be noted that in the embodiments in which all the instructions are assumed to have the same energy usage when executed, a lookup table may still be used and referred to when determining the energy usage of the issued instructions being executed. However, in an embodiment, all the weights are set to the same value (e.g. 1).

In an embodiment, the (e.g. relative) energy usage for each (e.g. different type of) instruction is determined, e.g., in advance, empirically to determine a set of reference energy usages for the different (e.g. types of) instructions (e.g. by directly measuring the energy usage of the execution processing circuitry when executing a reference set of (e.g. different types of) instructions). The reference energy usages may be determined and, e.g., fixed for a given graphics processing unit and/or instruction type.

The energy usage by the execution processing circuitry when executing instructions may be monitored over any suitable and desired time. For example, the energy usage may be monitored continuously and the issuing of instructions may be adjusted accordingly, e.g. continuously based on the monitoring.

However, in an embodiment, the energy usage is monitored over a particular period (e.g. a defined window) of time, and the issuing of instructions is controlled in the future time period (e.g. a future window of time), based on this monitoring. In an embodiment the duration of the time period (window) is set (e.g. as a constant, W) to be the same for all of the time periods.

Thus, in an embodiment, the energy management circuitry is operable to monitor the energy usage when executing instructions in a current time period. The future time period may be arranged relative to the current time period in any suitable and desired way. In an embodiment the future time period does not overlap with the current time period. The future time period may be at any time in the future. However, in an embodiment, the future time period is the next time period after (e.g. is continuous with) the current time period.

In these embodiments it will be seen that, for example, the instruction issuing circuitry issues a set of instructions to the execution processing circuitry in the current time period for execution, and the monitoring of the energy usage of the execution processing circuitry when executing this set of instructions is used to control the issuing of instructions in the next time period.

The permitted energy usage range for the future time period may be determined, based on the monitored energy usage, by the energy management circuitry in any suitable and desired way. In an embodiment the permitted energy usage range is determined using a permitted energy usage change for the future time period (as a deviation) from the monitored energy usage. Thus the energy usage in the future time period may be permitted to increase or decrease by up to the permitted energy usage change from the monitored energy usage. The permitted increase and decrease may be the same (i.e. symmetrical); however, in some embodiments it may be desirable to set the permitted energy usage range to be asymmetrical about the monitored energy usage, e.g. depending on the properties of the graphics processing unit.

The permitted energy usage change may be a fixed (absolute) change in the energy usage, which is independent of the monitored energy usage (but the monitored energy usage will still be used to set the permitted energy usage range, e.g. centred on the monitored energy usage). However, in an embodiment, the permitted energy usage change is based on (e.g. proportional to) the monitored energy usage. For example, a change of up to ±A % may be permitted.

In an embodiment the ratio of the permitted energy usage change to the monitored energy usage is set (e.g. as a constant) and used to determine the permitted energy usage change (as a deviation) from the monitored energy usage. In an embodiment the permitted energy usage range is then determined using the permitted energy usage change and the monitored energy usage, e.g. by determining a permitted minimum energy usage and a permitted maximum energy usage for the future time period, which thereby define the permitted energy usage range.

As an example, when determining the permitted energy usage range for the future time period:

$$\text{Delta} = W_{cost} * D$$

where Delta is the permitted energy usage change for the future time period, $W_{cost}$ is the monitored energy usage and D is the ratio of the permitted energy usage change to the monitored energy usage. This ratio may be set to be any suitable and desired value, e.g. as is appropriate for the implementation of the graphics processing unit. Then:

$$W_{min} = W_{cost} - \text{Delta; and}$$

$$W_{max} = W_{cost} + \text{Delta}$$

where $W_{min}$ and $W_{max}$ are the permitted minimum energy usage and the permitted maximum energy usage which thus define the permitted energy usage range for the future time period.

In another embodiment, the permitted energy usage change for the future time period (Delta) may be calculated using addition instead of multiplication, such that a linear (rather than exponential) growth of the energy usage may be supported.

The issuing of instructions by the instruction issuing circuitry to the execution processing circuitry in the future time period is controlled, based on the permitted energy usage range, e.g. to retain the actual energy usage, when the execution processing circuitry executes the instructions issued during the future time period, within the permitted energy usage range. Thus, when the energy usage is ramping up (increasing) (e.g. owing to an increase in the number of instructions and/or a change in the type of instructions to be issued for execution), the number of instructions issued in the future time period may be attenuated (e.g. capped) to avoid causing too large an increase in the energy usage (e.g. above the upper limit of the permitted energy usage range) over the future time period.

Conversely, when the energy usage is ramping down (decreasing) (e.g. owing to a decrease in the number of instructions and/or a change in the type of instructions to be issued for execution), the number of instructions issued in the future time period may be prevented from decreasing by too great an amount compared to the instructions currently being executed, to avoid causing too large a decrease in the energy usage (e.g. below the lower limit of the permitted energy usage range) over the future time period.

The instructions issued by the instruction issuing circuitry to the execution processing circuitry for execution may be controlled, based on the permitted energy usage range, in any suitable and desired way. In an embodiment the energy management circuitry is operable to determine an expected energy usage for (e.g. each of the) instructions that are scheduled to be issued in the future time period, and to use the determined expected energy usage for the instructions scheduled to be issued to control the issuing of the instructions to the execution processing circuitry by the instruction issuing circuitry during the future time period. For example, in an embodiment the energy management circuitry controls the issuing of instructions during the future time period so that the total determined expected energy usage of instructions that are issued to the execution processing circuitry is within the permitted energy usage range for the future time period.

In one embodiment, the determined expected energy usage for instructions (to be used for controlling the issue of instructions in the future time period) may also be used to monitor the energy usage of the instructions issued in the future time period, e.g. instead of subsequently monitoring the energy usage of these instructions the determined expected energy usage is simply used as the monitored energy usage. This determined (and thus monitored) energy usage of these instructions may then be used to determine the permitted energy usage range for the next future time period.

Similar to when monitoring the energy usage, in one embodiment, it may be assumed that all instructions cause (e.g. approximately) the same (or have a known, constant average) energy usage when executed. Thus, in one embodiment, the energy management circuitry determines the expected energy usage for instructions that are scheduled to be issued in the future time period simply by counting the number of instructions that are to be (or have been) issued in the future time period.

The issuing of instructions may then be controlled by using the determined number of instructions that are to be (or have been) issued in the future time period and the determined permitted energy usage range for the future time period (e.g. by comparing the number of instructions to the permitted energy usage range).

When the instructions to be issued are simply being counted to determine their number, in an embodiment the energy management circuitry determines a range for the number of instructions to be issued during the future time period, based on the permitted energy usage range, in order to control the number of instructions to be issued. (In some embodiments the permitted energy usage range may be (or have been) determined as a number of instructions, so no conversion may be necessary, and thus the step of determining the permitted energy usage range may comprise determining a permitted range for the number of instructions to be issued during the future time period.)

In an embodiment the determined range for the number of instructions is expected to cause the execution processing circuitry to have an energy usage range (e.g. approximately) corresponding to the permitted energy usage range, when the instructions are executed. In an embodiment the energy management circuitry controls the number of instructions issued during the future time period to be within the determined range for the number of instructions to be issued.

As has been appreciated, however, different (e.g. types of) instructions may have corresponding different execution processing circuitry energy usages when these instructions are executed. In an embodiment these different energy usages are taken into account by the energy management circuitry when controlling the issuing of instructions by the instruction issuing circuitry to the execution processing circuitry.

Thus, in one embodiment (in a similar manner to when monitoring the energy usage), the energy management circuitry determines the expected energy usage for instructions that are scheduled to be issued in the future time period by using the (e.g. known, e.g. stored) reference energy usage (e.g. weighting) for each (e.g. different type of) instruction. (In an embodiment these reference energy usages for different (e.g. types of) instructions are determined and, e.g., stored as outlined above for use when monitoring the energy usage.) Thus, in an embodiment, each instruction scheduled to be issued is weighted by (e.g. a coefficient of) its reference energy usage to determine the expected energy usage of the instruction.

The issuing of instructions may then be controlled by using the determined expected energy usage of instructions that are to be (or have already been) issued in the future time period and the determined permitted energy usage range for the future time period (e.g. by comparing the weighted instructions to the permitted energy usage range).

In one embodiment the energy management circuitry is operable to determine the expected energy usage for all the instructions that are desired (e.g. have been requested) to be issued during the (e.g. defined) future (e.g. next) time period, e.g. before instructions are issued to the execution processing circuitry in the future time period. In an embodiment the energy management circuitry is then operable to control the issuing of instructions by the instruction issuing circuitry to the execution processing circuitry in the future time period using the expected energy usage for all the instructions that are desired to be issued during the future time period.

When the expected energy usage of all the instructions that are desired to be issued during the future time period is less than or equal to the upper limit of the permitted energy usage range, in an embodiment the energy management circuitry is operable to control the instruction issuing circuitry to issue, during the future time period, all of the instructions that are desired to be issued during the future time period. (As discussed below, when the expected energy usage for all the instructions is also less than the lower limit of the energy usage range, in an embodiment the energy management circuitry is operable to execute further instructions to prevent the energy usage of the execution processing circuitry falling below the lower limit of the energy usage range during the future time period when the instructions are executed.)

When the expected energy usage of all the instructions that are desired to be issued during the future time period is greater than the upper limit of the permitted energy usage range, in an embodiment the energy management circuitry is operable to determine which of the instructions that are desired to be issued during the future time period are to be issued by the instruction issuing circuitry during the future time period, and then controlling the instruction issuing circuitry to issue these (e.g. selected) instructions to the execution processing circuitry during the future time period for execution. Determining (e.g. selecting) the instructions to be issued helps to keep the actual energy usage, when the execution processing circuitry executes these instructions during the future time period, within the permitted energy usage range.

Determining the expected energy usage of all the instructions that are desired to be issued during the future time period may also allow the energy management circuitry to determine whether the energy is ramping up or down (and by how much). This may help the energy management circuitry to determine whether it will be necessary to impose a limit on the number of instructions to be issued during the future time period (when the energy is ramping up), to prevent the number of instructions to be issued during the future time period from decreasing by too great an amount compared to the instructions currently being executed (when the energy is ramping down), or that no action will be necessary and the instructions scheduled to be issued can simply be issued (when the expected energy usage of the scheduled instructions is within the permitted energy usage range for the future time period).

The instructions to be issued, when the expected energy usage of all the instructions that are desired to be issued during the future time period exceeds the upper limit of the permitted energy usage range, may be determined in any suitable and desired way. In one embodiment the instructions are issued by the instruction issuing circuitry to the execution processing circuitry simply in the order in which they have been scheduled initially (e.g. in the order they are submitted to the instruction issuing circuitry by the graphics processing program generating the instructions), thus using a "first in, first out" system, until the expected energy usage of the instructions issued by the instruction issuing circuitry to the execution processing circuitry has reached the upper limit of the permitted energy usage range for the future time period (e.g. when the issuing of a further instruction would exceed the upper limit of the permitted energy usage range for the future time period).

In one embodiment, the instructions may be prioritised and the instruction processing circuitry may issue instructions to the execution processing circuitry based on the priority of the instructions, e.g. such that the instructions may not be issued to the execution processing circuitry in the order in which they were scheduled originally. Instead, in an embodiment, higher priority instructions are issued before lower priority instructions.

The instructions may be prioritised in any suitable and desired way. For example, the instructions may be prioritised based on the length of time they have been waiting to be issued to the execution processing circuitry. Thus instructions that have been waiting for longer may have their priority increased so that they can be issued to the execution processing circuitry before instructions that have only recently been submitted to the instruction issuing circuitry for issue to the execution processing circuitry.

The (e.g. different types of) instructions may, for example, be prioritised based on how important (e.g. critical) the instructions are to the graphics processing program. It will be appreciated that in a sequence of instructions to be executed for a graphics processing program, some instructions may rely on the result of other instructions having been executed. When these more important instructions, the results of which are to be used by other instructions, are not executed, the execution of the sequence of instructions may stall. Instructions that are more important to the graphics processing operations may thus have their priority increased so that they can be issued to the execution processing circuitry before instructions that are determined to be less important.

In one embodiment, e.g. instead of determining the expected energy usage for all the instructions desired to be issued in the future time period, in an embodiment the energy management circuitry is operable to determine the expected energy usage for each of the scheduled instructions to be issued in turn (e.g. when they are next to be issued to the execution processing circuitry). In an embodiment, the energy management circuitry then controls the instruction issuing circuitry to issue the next instruction to be issued when the expected energy usage for the next instruction does not exceed the (e.g. remaining) permitted energy usage range for the future time period.

Thus the expected energy usage for each instruction is assessed (when an instruction is next to be issued) and a decision as to whether or not to issue the instruction is made on this basis, taking into account the permitted energy usage range and the expected energy usage of the instructions already issued to the execution processing circuitry during the future time period. As discussed above, the instructions scheduled to be issued may be (re)ordered to prioritise important instructions (e.g. ones that are critical to the graphics processing operation that is being performed) or instructions that have been waiting longer than others to be executed.

As has been alluded to, the energy management circuitry may control the issuing of instructions by the instruction issuing circuitry in different ways depending on whether the energy usage of the execution processing circuitry is ramping up, ramping down or staying roughly the same in the future time period compared to the current energy usage monitored for the instructions being executed. When the (e.g. expected) energy usage of the execution processing circuitry in the future time period is within the permitted energy usage range (and thus is approximately equal to the current energy usage being monitored), in an embodiment the energy management circuitry simply allows the instruction issuing circuitry to issue the instructions it has scheduled for the future time period.

When the energy usage is ramping up in the future time period, in an embodiment the energy management circuitry controls the instruction issuing circuitry to issue instructions to the execution processing circuitry during the future time period until the expected energy usage of the issued instructions reaches (and does not exceed) the upper limit of the permitted energy usage range for the future time period, e.g. such that were the next instruction to be issued its expected energy usage would (together with the instructions already issued in the future time period) exceed the upper limit of the permitted energy usage for the future time period (and to control the instruction issuing circuitry to prevent instructions being issued to the execution processing circuitry during the remainder of the future time period).

In an embodiment the energy management circuitry determines, when an instruction is to be issued to the execution processing circuitry, the remaining permitted energy usage budget for the future time period (i.e. the difference between the expected energy usage of the instructions issued to the execution processing circuitry in the future time period and the upper limit of the permitted energy usage range) and uses the remaining permitted energy usage budget to control whether or not the instruction is issued by the instruction issuing circuitry to the execution processing circuitry. Thus, in an embodiment, the energy management circuitry is operable to control the instruction issuing circuitry to issue an instruction to the execution processing circuitry when the expected energy usage for the instruction to be issued is less than the remaining permitted energy usage budget, and to control the instruction issuing circuitry to prevent an instruction from being issued (and, e.g., any further instructions from being issued to the execution processing circuitry during the future time period) when the expected energy usage for the instruction to be issued exceeds the remaining permitted energy usage budget.

The instructions to be issued may be assessed and their issue for execution controlled, as described above, on an individual basis. This provides a fine granularity for the control of the instructions that are issued for execution. The instructions to be issued may alternatively be assessed, and their issue for execution controlled, in groups of plural instructions, e.g. the instructions that are scheduled for execution in the future time period. This latter embodiment may be used, for example, when the energy usage budget is set in increments of plural instructions, such that it may not be possible to control the issuing of instructions at a finer granularity.

The energy management circuitry may, for example, assess the remaining permitted energy usage budget for the future time period each execution cycle of the execution processing circuitry, taking into account the instructions issued thus far in the future time period, and control the instructions issued in that execution cycle accordingly.

When the energy usage is ramping down in the future time period, in an embodiment the energy management circuitry controls the instruction issuing circuitry to issue instructions to prevent the energy usage in the future time period from being below the lower limit of the permitted energy usage range. Thus, in an embodiment, the energy management circuitry is operable to determine when the instructions to be (or have been) issued to the execution processing circuitry during the future time period have an expected energy usage that is less than the lower limit of the permitted energy usage range (and then to control the instruction issuing circuitry to issue further instructions accordingly).

Instructions may be issued to prevent the energy usage in the future time period from falling below the lower limit of the permitted energy usage range in any suitable and desired way. In an embodiment the energy management circuitry controls the instruction issuing circuitry to issue "supplementary" instructions to the execution processing circuitry during the future time period for execution. The execution of these supplementary instructions helps to keep the execution processing circuitry busy using energy, and thus avoid there being too great a drop in energy usage in the future time period. The execution of the supplementary instructions by the execution processing circuitry also means that it may (and, e.g., is) not be necessary to provide any additional hardware to manage the energy usage.

The supplementary instructions issued by the instruction issuing circuitry may be any suitable and desired type of instructions for the execution processing circuitry to execute, e.g. instructions which are not part of the sequence of instructions for the graphics processing program. Thus, the supplementary instructions, when executed, may not perform graphics processing operations. In an embodiment the supplementary instructions, when executed by the execution processing circuitry, do not affect or update the useful state of the graphics processing operations (e.g. the data that is being operated on or output by the instructions being executed for the graphics processing programs), do not cause any special kind of data path handling (e.g. of the processing circuitry) or other effect on the functional correctness of the graphics processing unit, etc. Thus, in an embodiment, the supplementary instructions are executed solely to cause energy usage of the execution processing circuitry.

The supplementary instructions may comprise "dummy" instructions, e.g. simply executed to consume energy and not providing any useful result or function. However, in an embodiment, the supplementary instructions are instructions that, when executed, perform operations that are otherwise needed to be performed by the graphics processing unit. Such operations may include "self-checks", debugging or analysis that may be required by the graphics processing unit. In an embodiment such supplementary operations are not time dependent or time critical.

In one embodiment the supplementary instructions may comprise instructions for executing a small program by the execution processing circuitry, e.g. on one or more (e.g. all) of the functional units. The program may compare its output to a known output, which could be used to detect faults in the execution processing circuitry.

In one embodiment the supplementary instructions may comprise instructions for performing a "best effort" calculation, e.g. calculating a number as accurately as possible. Such accuracy may be desirable but not essential, for example, for the graphics processing operations being performed.

As with the instructions of the graphics processing programs which are issued to the execution processing circuitry, the issuing of the supplementary instructions by the instruction issuing circuitry may be controlled by the energy management circuitry in any suitable and desired way, e.g. to retain the energy usage of the execution processing circuitry within the permitted energy usage range (e.g. above the lower limit of the permitted energy usage range). Thus, for example, the energy management circuitry may control the instruction issuing circuitry to issue a certain number of supplementary instructions in the future time period (e.g. when the permitted energy usage range is determined in or converted to a permitted range of number of instructions).

However, as with the instructions of the graphics processing programs, the (e.g. different types of) supplementary instructions may, when executed, cause different energy usages. Therefore, in an embodiment, the energy management circuitry controls the instructions issuing circuitry to issue supplementary instructions based on the (e.g. known) energy usage (weighting) of different (e.g. types of) instructions. This may control the instruction issuing circuitry to issue certain types of supplementary instructions, e.g. after determining the expected energy usage of the (e.g. different types of) supplementary instructions.

The Applicant has also appreciated that the energy usage of the execution processing circuitry when executing supplementary instructions may depend on their operands. In one embodiment the energy management circuitry controls the instructions issuing circuitry to issue supplementary instructions having operands with a particular Hamming distance from the operands of the previously executed instruction. By controlling the Hamming distance between operands, the energy usage of the execution processing circuitry may be controlled, e.g. in a more sophisticated and finer grained manner.

For example, the use of consecutive operands having a higher Hamming distance between them will generally incur a higher energy usage for the execution processing circuitry, owing to the toggling of bits in the operands. In an embodiment, to maximise the Hamming distance between operands, the operand(s) for a supplementary operation are the binary "not" of the operand(s) of the previously executed instruction.

When controlling (e.g. choosing) the operand(s) for a supplementary operation (e.g. to maximise their Hamming distance), in an embodiment the operand(s) are chosen such that they do not cause any special kind of data path handling (e.g. of the processing circuitry) or other effect on the functional correctness of the graphics processing unit, etc. For example, the operands should be chosen such that they do not return the result "NaN" (not a number) or "Inf" (positive infinity), e.g. for a floating point variable when the previous operation was a real number.

As well as controlling the energy usage from increasing or decreasing by too large an amount in the future time period, it will also be appreciated that when the instructions scheduled to be issued in the future time period are such that the energy management circuitry determines that their execution is, e.g., expected not to increase or decrease the energy usage outside of the permitted energy usage range (e.g. owing to an insignificant change in the number of instructions and/or in the type of instructions to be issued for execution), in an embodiment the energy management circuitry acts passively and simply allows the instruction issuing circuitry to issue the scheduled instructions in the future time period to the execution processing circuitry for execution.

As has been described above, in an embodiment the permitted energy usage range is determined and the issuing of instructions is controlled over a defined time period (window). The Applicants have appreciated, however that depending on the duration of the time periods (which may be chosen, e.g. set, in any suitable and desired way), the energy usage of the graphics processing unit may be susceptible to changes (which may be relatively large) within a time period, which may still be problematic for the energy management of the graphics processing unit (e.g. were all of the scheduled instructions to be executed at the beginning of a time period).

The duration of the time periods could be reduced to counteract this. However, this may make it more difficult to monitor changes in the energy usage over time and so may still result in relatively large changes in the energy usage of the graphics processing unit.

In an embodiment the (e.g. each) time periods are divided into a plurality of (smaller) time intervals. Thus, in an embodiment, the future time period comprises a plurality of time intervals, the permitted energy usage range is distributed (e.g. evenly) over the plurality of time intervals of the future time period and the issuing of instructions is controlled during each of the plurality of time intervals based on the distributed permitted energy usage range for that time interval.

Distributing the energy usage range (and thus the issuing of instructions) over multiple time intervals for a time period helps to avoid too big a step in energy increase at any particular point during the time period. This may be done, rather than simply making the time period smaller, because the smaller the time period, then the more susceptible the measurement and operation may be to transient spikes in energy usage, for example.

The time periods may be split up into a plurality of time intervals in any suitable and desired way. In an embodiment the time periods are divided into a plurality of equal time intervals. In an embodiment the number of time intervals into which a (e.g. each) time period is divided is set (e.g. as a constant, R).

All of the time periods may be divided into a plurality of time intervals, as described above. However, in an embodiment, only the time periods when the energy usage is increasing (e.g. predicted to be greater in the future time period than the currently monitored time period) are divided into a plurality of time intervals in this way. It may not be necessary to divide the time periods when the energy usage is decreasing, e.g. because a large decrease in energy usage can be counteracted through the issuing of supplementary instructions.

The various parameters (e.g. constants) used by the (e.g. energy management circuitry of the) graphics processing unit may be (e.g. set and) provided thereto in any suitable and desired way. (As discussed above, these parameters include one or more (e.g. all) of: the duration of (e.g. each of) the time periods (W), the ratio of the permitted energy usage change to the monitored energy usage (D), the percentage increase from the monitored energy usage to the maximum limit of the permitted energy usage range (A), the energy usage weightings of the different instruction types ($T_i$), and the number of time intervals into which a time period is divided (R).)

In an embodiment the one or more parameters are set in and provided to the (e.g. energy management circuitry of the) graphics processing unit by a driver for the graphics processing unit, e.g. a driver of a data (e.g. graphics) processing system that, in an embodiment, comprises the graphics processing unit of the technology described herein. The one or more parameters may then be read and used by the (e.g. energy management circuitry of the) graphics processing unit, as appropriate.

The one or more parameters may be set, e.g. by the driver, when the graphics processing unit is being configured, e.g. at boot-up or energy on, and remain in place until the graphics processing unit is reset or powered off.

The values of the one or more parameters may be chosen in any suitable and desired way. In one embodiment one or more (e.g. all) of the parameters are set as a function of, and to reflect, the (e.g. energy management) capabilities of the particular graphics processing unit being used. For example, a particular graphics processing unit may have (e.g. energy management) performance characteristics that make it more or less capable at dealing with changes in its energy usage, and thus the one or more parameters may be set appropriately, e.g. to control the changes in the energy usage. Thus, the one or more parameters may only need to be "globally", such that they are set and remain static for the operational "lifetime" of the graphics processing unit (e.g. from boot-up or power on to reset or power off).

Although embodiments of the technology described herein have been described above primarily with reference to the monitoring of the energy usage of the execution processing circuitry when executing instructions (e.g. in one time period) and the controlling of the issuing of instructions in a future time period, based on a permitted energy usage range determined from the monitored energy usage, in an embodiment the method of the technology described herein is repeated over plural time periods, e.g. during operation of the graphics processing unit while executing the sequence(s) of operations of one or more graphics processing programs. In an embodiment the graphics processing unit and its various circuitry is operable to repeat the steps for plural time periods.

Thus, for example, the energy usage is monitored in a first time period, the permitted energy usage range for a second time period is determined and the issue of instructions for execution in the second time period is controlled using the permitted energy usage range. The execution of the instructions in the second time period is then monitored, the permitted energy usage range is determined for a third time period and the issue of instructions for execution in the third time period is controlled using the permitted energy usage range for this time period, etc.

The technology described herein has been described above with reference to the operation of the graphics processing unit in general. In the case where the graphics processing unit includes multiple processing engines, then each processing engine could be operated in the manner of the technology described herein (i.e. such that each processing engine has its own respective execution processing circuitry, instruction issuing circuitry and energy management circuitry, etc., all of which are operable in the manner of the technology described herein).

However, the current draw (and thus the power usage) of a graphics processing unit is generally a global (chip-level) phenomenon. Thus, as will be discussed further below, in an embodiment (when the graphics processing unit includes multiple processing engines), the graphics processing unit comprises common energy management circuitry operable to control the energy usage of (e.g. each of) the processing engines. Despite this, the permitted energy usage range may be divided between the processing engines, for example, such that the control of instructions being issued to the processing engines is performed relatively independently of each other.

Different processing engines may, for example, be configured (e.g. programmed) to execute instructions for different shader stages, e.g. to perform particular graphics processing operations, of a graphics processing pipeline.

Thus, in an embodiment, the technology described herein is used for and when (the execution processing circuitry of) the graphics processing unit is executing a (programmable) processing stage of a graphics processing pipeline. In this case therefore, the execution processing circuitry will be executing a program (a set of instructions) to perform processing operations of a (programmable) processing stage of a graphics processing pipeline, with instructions (e.g. arranged in thread groups) being issued to the execution processing circuitry to execute the (programmable) processing stage in the manner of the technology described herein.

The operation in the manner of the technology described herein can be, and is in an embodiment, used for plural processing stages of a graphics processing pipeline (where the pipeline comprises plural programmable processing stages). In an embodiment the operation in the manner of the technology described herein is used for all (programmable) processing stages that the graphics processing unit may be required to execute.

The processing stage can comprise any suitable and desired (programmable) processing stage of a graphics processing pipeline. In an embodiment, the processing stage is a programmable processing stage of a graphics processing pipeline. In this case, the processing stage in an embodiment comprises a programmable shading stage (shader). The programmable processing stage that the program is executing may, for example, be a geometry shading stage (geometry shader), a vertex shading stage (vertex shader), or a fragment shading stage (fragment shader).

The graphics processing unit (and, e.g., each processing engine) may comprise a plurality of processing cores (e.g. each comprising its own respective execution processing circuitry) for executing the instructions to perform graphics processing operations. In turn, (e.g. each of) the processing engines or processing cores may comprise a plurality of functional execution units (e.g. each comprising its own respective execution processing circuitry) for executing the instructions to perform graphics processing operations. Different functional (e.g. arithmetic logical) units may, for example, be configured (e.g. programmed) to execute different (e.g. arithmetic) operations.

The processing engines, cores and/or functional units could (e.g. each) be operated in the manner of the technology described herein for the graphics processing unit (and thus, for example, have associated energy management circuitry and instruction issuing circuitry). However, when the graphics processing unit comprises plural processing engines, cores and/or functional units, in an embodiment the graphics processing unit comprises common energy management circuitry (e.g. at least for each processing engine of the graphics processing unit) for the plural processing engines, cores or functional units. In an embodiment the method comprises (and the energy management circuitry is operable to) monitoring the (total) energy usage of the plural processing engines, cores or functional units, determining the (total) permitted energy usage range for the plural processing engines, cores or functional units, and controlling the issuing of instructions to the plural processing engines, cores or functional units by the instruction issuing circuitry during the future time period based on the (total) permitted energy usage range determined for the future time period. In this way, the energy usage of the graphics processing unit (or engine) as a whole is able to be controlled through the control of issuing instructions at a particular level of execution processing circuitry.

Similarly, there may be common instruction issuing circuitry for the plural processing engines, cores or functional units, and the instruction issuing circuitry may distribute the instructions issued in the future time period between the plural processing engines, cores or functional units under the control of the energy management circuitry. However, in an embodiment, each of the plurality of processing engines, cores or functional units has associated with it instruction issuing circuitry that is controlled by the (e.g. common) energy management circuitry.

Thus, in an embodiment, the (e.g. common) energy management circuitry is in communication with the instruction issuing circuitry (e.g. for each of the plural processing engines, cores or functional units). In an embodiment the execution processing circuitry (e.g. each of the plural processing engines, cores or functional units, or the (e.g. respective) instruction issuing circuitry) is in communication with the (e.g. common) energy management circuitry, and the execution processing circuitry or the instruction issuing circuitry is operable to feedback the energy usage of the execution processing circuitry to the (e.g. common) energy management circuitry, to allow the energy management circuitry to monitor the energy usage.

In an embodiment the permitted energy usage range for the future time period is divided (e.g. evenly) between the plural processing engines, cores or functional units by the energy management circuitry, e.g. so that the instruction issuing circuitry of each of the plural processing engines, cores or functional units has an energy usage budget (range) for the future time period. Thus the issuing of instructions may be controlled (e.g. individually and independently) for each of the plural processing engines, cores or functional units. Similarly, in an embodiment, the energy usage of (e.g. each of) the plural processing engines, cores or functional units is monitored by the energy management circuitry.

In some embodiments, the graphics processing unit comprises, and/or is in communication with, one or more memories and/or memory devices that store the data described herein, and/or store software for performing the processes described herein. The graphics processing unit may also be in communication with a host microprocessor, and/or with a display for displaying images based on the data generated by the graphics processing unit.

In an embodiment, the graphics processing unit is part of an overall data (e.g. graphics) processing system that comprises one or more memories and/or memory devices and a host processor (and, optionally, a display). In an embodiment, the host microprocessor is operable to execute applications (e.g. shader programs) that require graphics processing by the graphics processing unit, with the graphics processing unit operating in the manner of the technology described herein when required to process data by applications executing on the host processor.

Other arrangements would, of course, be possible.

The technology described herein can be used for all forms of output that a graphics processing unit (and a graphics processing pipeline) may be used to generate. For example, the graphics processing unit may generate frames for display, render-to-texture outputs, etc. The output data values from the graphics processing unit are in an embodiment exported to external, e.g. main, memory, for storage and use, such as to a frame buffer for a display.

The technology described herein is applicable to any suitable form or configuration of graphics processing unit and data (e.g. graphics) processing system. It is particularly applicable to tile-based graphics processing units and graphics processing systems. Thus in an embodiment, the graphics processing unit is a tile-based graphics processing unit (and pipeline).

In an embodiment, the various functions of the technology described herein are carried out on a single graphics processing platform that generates and outputs data (such as rendered fragment data that is, e.g., written to the frame buffer), for example for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., when desired.

Subject to any hardware necessary to carry out the specific functions discussed above, the graphics processing unit and pipeline can otherwise include any one or more or all of the usual functional units, etc., that data processing systems and pipelines include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software, e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a processor, renderer or microprocessor system comprising a graphics processing unit causes in conjunction with said graphics processing unit said processor, renderer or microprocessor system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display using a graphics processing unit and the energy management of the graphics processing unit.

FIG. 1 shows schematically a typical computer graphics processing system. An application 2, such as a game, executing on a host processor 1 will require graphics processing operations to be performed by an associated graphics processing unit (graphics processing pipeline) 3. To do this, the application will generate API (Application Programming Interface) calls that are interpreted by a driver 4 for the graphics process pipeline 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

Figure 2:
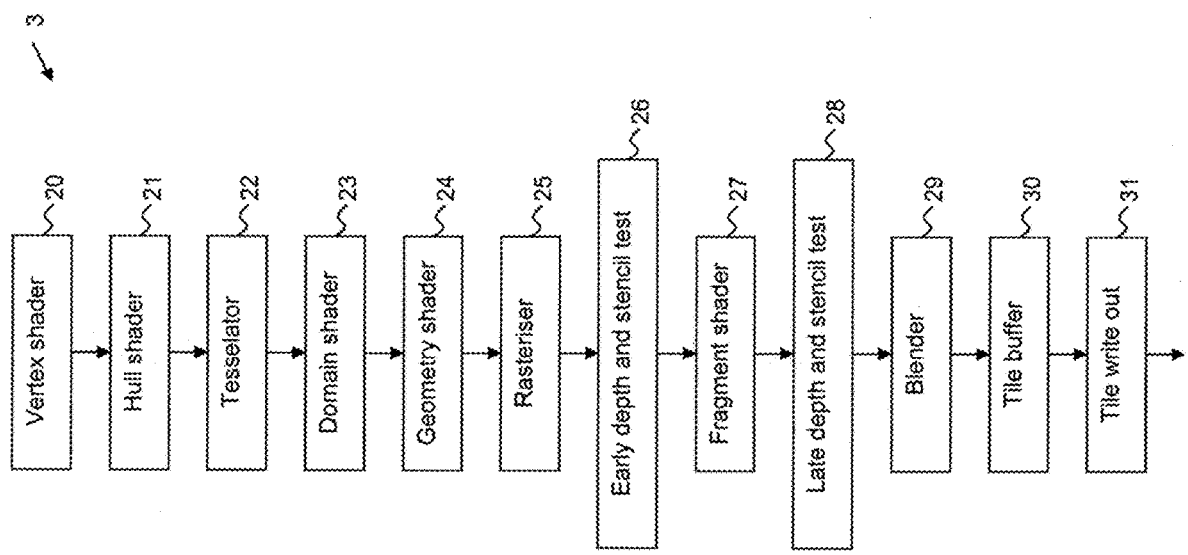
FIG. 2 shows schematically a graphics processing pipeline that can be operated in the manner of the technology described herein.

FIG. 2 shows the graphics processing pipeline 3 of the present embodiment in more detail.

The graphics processing pipeline 3 shown in FIG. 2 is a tile based renderer and will thus produce tiles of a render output data array, such as an output frame to be generated.

In tile based rendering, rather than the entire render output, e.g., frame, effectively being processed in one go as in immediate mode rendering, the render output, e.g., frame to be displayed, is divided into a plurality of smaller sub regions, usually referred to as "tiles". Each tile (sub region) is rendered separately (typically one after another), and the rendered tiles (sub regions) are then recombined to provide the complete render output, e.g., frame for display. In such arrangements, the render output is typically divided into regularly sized and shaped sub regions (tiles) (which are usually, e.g., squares or rectangles), but this is not essential.

The render output data array may typically be an output frame intended for display on a display device, such as a screen or printer, but may also, for example, comprise intermediate data intended for use in later rendering passes (also known as a "render to texture" output), etc.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

FIG. 2 shows the main elements and pipeline stages of the graphics processing pipeline 3 that are relevant to the operation of the present embodiment. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuitry and/or processing logic, etc., for performing the necessary operation and functions.

As shown in FIG. 2, the graphics processing pipeline 3 includes a number of stages, including vertex shader 20, a hull shader 21, a tesselator 22, a domain shader 23, a geometry shader 24, a rasterisation stage 25, an early Z (depth) and stencil test stage 26, a renderer in the form of a fragment shading stage 27, a late Z (depth) and stencil test stage 28, a blending stage 29, a tile buffer 30 and a downsampling and writeout (multisample resolve) stage 31.

The vertex shader 20 takes the input data values associated with the vertices, etc., defined for the output to be generated, and processes those data values to generate a set of corresponding "vertex shaded" output data values for use by subsequent stages of the graphics processing pipeline 3.

The vertex shading, for example, modifies the input data to take account of the effect of lighting in the image to be rendered.

The hull shader 21 performs operations on sets of patch control points and generates additional data known as patch constants, the tessellation stage 22 subdivides geometry to create higher order representations of the hull, the domain shader 23 performs operations on vertices output by the tessellation stage (similar to a vertex shader), and the geometry shader 24 processes entire primitives such as a triangles, points or lines. These stages together with the vertex shader 21 effectively perform all the necessary fragment frontend operations, such as transformation and lighting operations, and primitive setup, to setup the primitives to be rendered, in response to commands and vertex data provided to the graphics processing pipeline 3.

The rasterisation stage 25 of the graphics processing pipeline 3 operates to rasterise the primitives making up the render output (e.g. the image to be displayed) into individual graphics fragments for processing. To do this, the rasteriser 25 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 26 performs a Z (depth) test on fragments it receives from the rasteriser 25, to see when any fragments can be discarded (culled) at this stage. To do this, it compares the depth values of (associated with) fragments issuing from the rasteriser 25 with the depth values of fragments that have already been rendered (these depth values are stored in a depth (Z) buffer that is part of the tile buffer 30) to determine whether the new fragments will be occluded by fragments that have already been rendered (or not). At the same time, an early stencil test is carried out.

Fragments that pass the fragment early Z and stencil test stage 26 are then sent to the fragment shading stage 27. The fragment shading stage 27 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 27 is in the form of a shader pipeline (a programmable fragment shader).

There is then a "late" fragment Z and stencil test stage 28, which carries out, inter alia, an end of pipeline depth test on the shaded fragments to determine whether a rendered fragment will actually be seen in the final image. This depth test uses the Z buffer value for the fragment's position stored in the Z-buffer in the tile buffer 30 to determine whether the fragment data for the new fragments should replace the fragment data of the fragments that have already been rendered, by, as is known in the art, comparing the depth values of (associated with) fragments issuing from the fragment shading stage 27 with the depth values of fragments that have already been rendered (as stored in the depth buffer). This late fragment depth and stencil test stage 28 also carries out any necessary "late" alpha and/or stencil tests on the fragments.

The fragments that pass the late fragment test stage 28 are then subjected to, when required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer 30 from where they can, for example, be output to a frame buffer for display. The depth value for an output fragment is also written appropriately to a Z buffer within the tile buffer 30. The tile buffer stores colour and depth buffers that store an appropriate colour, etc., or Z value, respectively, for each sampling point that the buffers represent (in essence for each sampling point of a tile that is being processed). These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 30 is input to a downsampling (multisample resolve) write out unit 31, and thence output (written back) to an external memory output buffer, such as a frame buffer of a display device (not shown). The display device could comprise, e.g., a display comprising an array of pixels, such as a computer monitor or a printer.

The downsampling and writeout unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 3 would, of course, be possible.

The above describes certain features of the operation of the graphics processing system shown in FIG. 1. Further features of the operation of the graphics processing system shown in FIG. 1 in accordance with embodiments of the technology described herein will now be described.

As can be seen from FIG. 2, the graphics processing pipeline 3 includes a number of programmable processing or "shader" stages, namely the vertex shader 20, hull shader 21, domain shader 23, geometry shader 24, and the fragment shader 27. These programmable shader stages execute respective shader programs that have one or more input variables and generate sets of output variables and that are provided by the application.

To do this, the application 2 provides the shader programs implemented using a high-level shader programming language, such as GLSL, HLSL, OpenCL, etc. These shader programs are then translated by a shader language compiler to binary code for the target graphics processing pipeline 3. This may include the creation of one or more intermediate representations of the program within the compiler. The compiler may, e.g., be part of the driver 4, with there being a special API call to cause the compiler to run. The compiler execution can thus be seen as being part of the draw call preparation done by the driver in response to API calls generated by an application. (Other compiler arrangements would, of course, be possible.)

Figure 3:
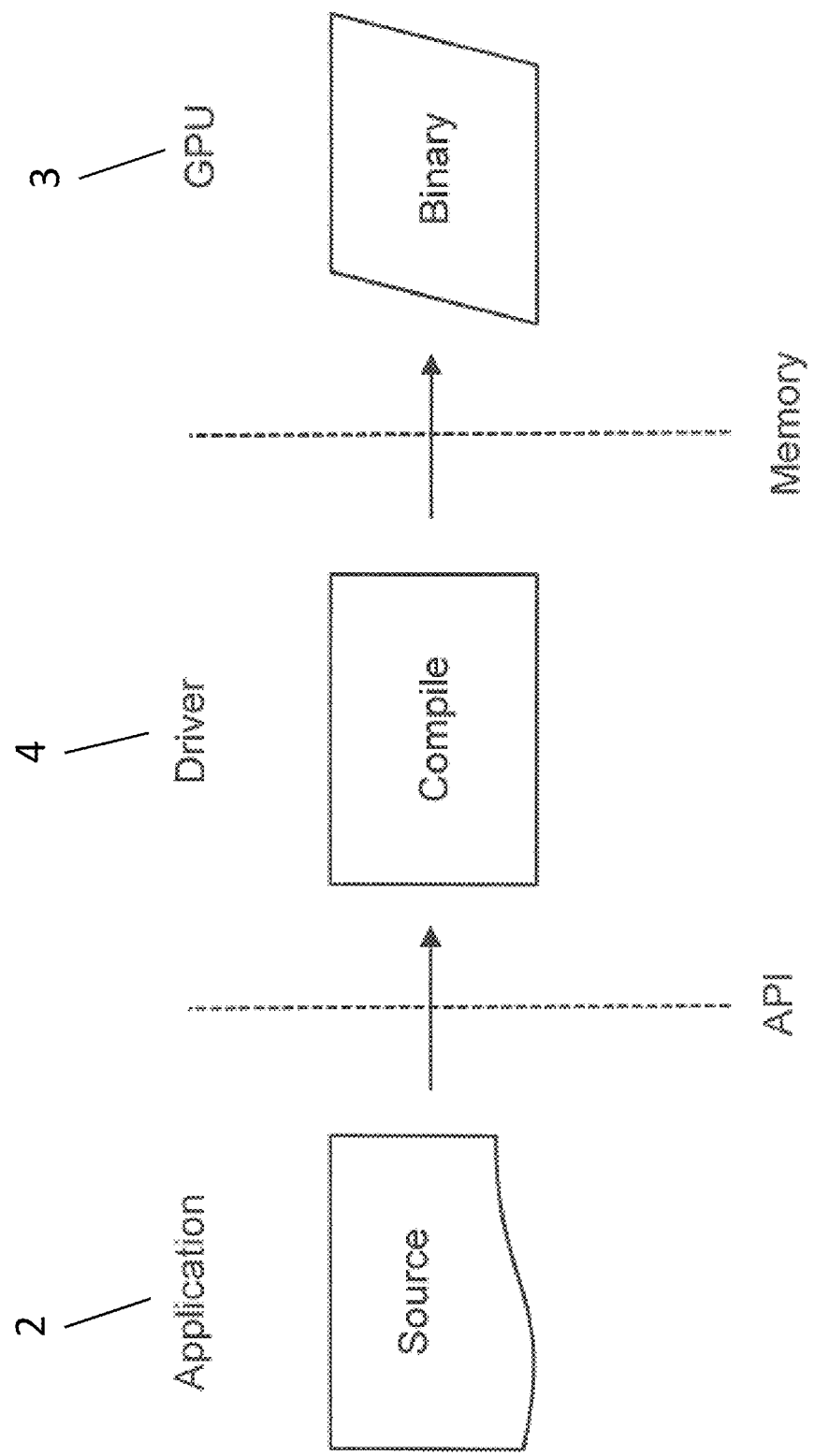
FIG. 3 shows schematically the compiling of a shader program for execution by a graphics processing pipeline.

FIG. 3 illustrates this, and shows the shader program being provided in the high level shader programming language by the application 2 to the driver 4, which then compiles the shader program to the binary code for the graphics processing pipeline 3.

Figure 4:
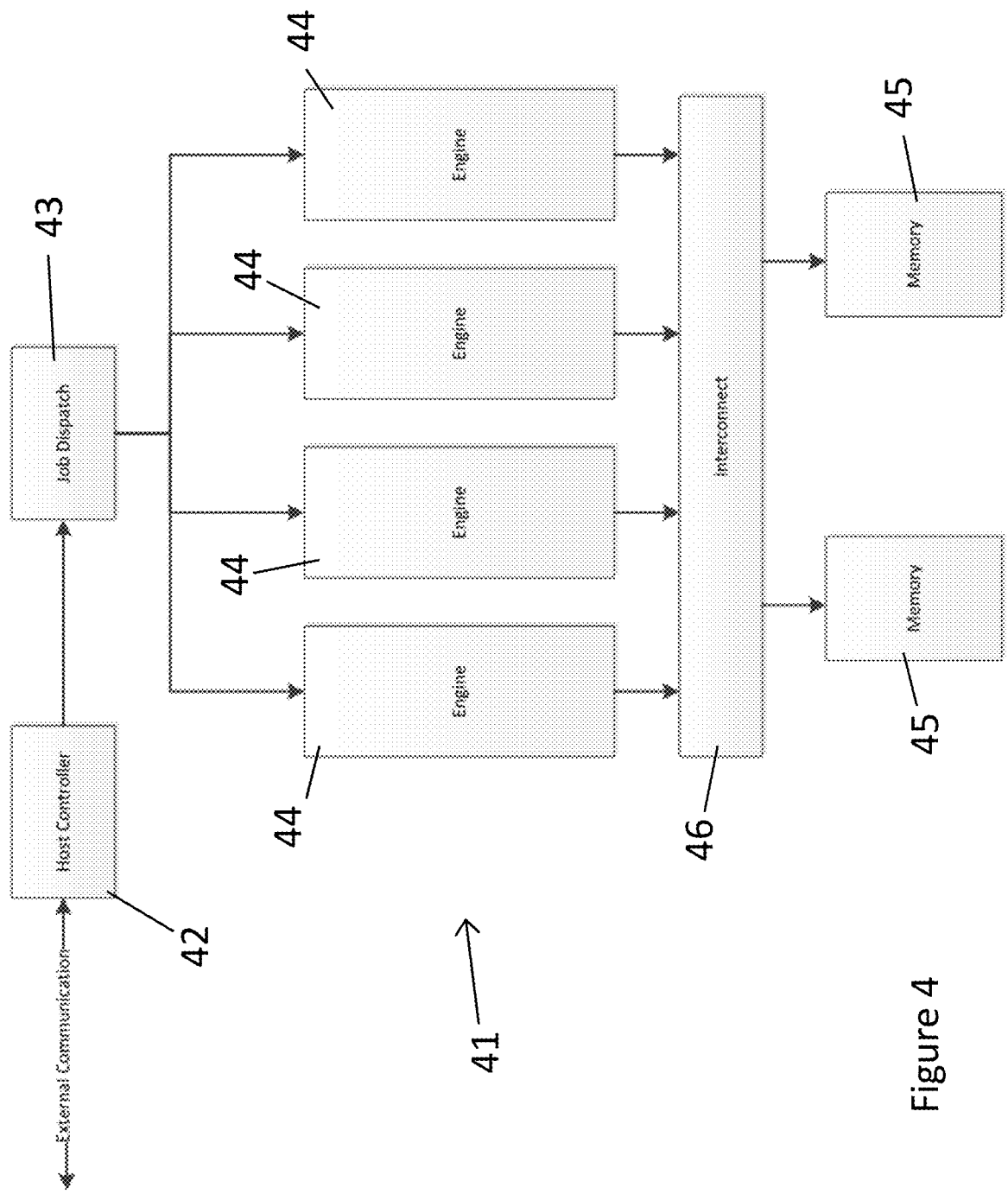
FIG. 4 shows schematically a graphics processing unit that can be operated in the manner of the technology described herein.

As discussed above, each shader in the graphics processing pipeline is a processing stage that performs graphics processing by running small programs for each "work" item in a graphics output to be generated (an "item" in this regard is usually a vertex, or a fragment). For each work item to be processed, an execution thread that will execute the corresponding shader program is issued to appropriate programmable processing circuitry that then executes the shader program for the execution thread in question. FIG. 4 shows how a graphics processing unit is arranged to execute such shader programs for execution threads.

FIG. 4 shows schematically a graphics processing unit 41 (e.g. the GPU 3 shown in FIG. 1) for executing shader programs for execution threads, in accordance with an embodiment of the technology described herein. The graphics processing unit 41 receives commands from a host controller 42 (e.g. the host 1 shown in FIG. 1). FIG. 4 also shows that the host controller 42 transmits and receives external communications, e.g. to and from peripheral components of the graphics processing system.

The graphics processing unit 41 includes a job dispatch unit 43 that receives commands from the host controller 42 and, based on these commands, dispatches "jobs" (instructions for the execution of shader programs for execution threads for work items) to GPU engines 44. Each processing engine 44 may (e.g. comprise programmable processing circuitry to) implement one or more particular shader stages (e.g. from the graphics processing pipeline 3 shown in FIG. 2) and thus the job dispatch module 43 may direct the jobs to the appropriate processing engine 44, depending on the shader program to be executed. Each processing engine 44 will generally include multiple functional units that execute the instructions for the shader programs, as will be described with reference to FIG. 5.

The results of the execution of the job instructions are output to external memory 45 via an interconnect 46 that permits the processing engines 44 to communicate with the memory 46. This enables the render output to be stored in the memory 45 (e.g. in a frame buffer) so that it may then be used in further processing or displayed, for example.

Figure 5:
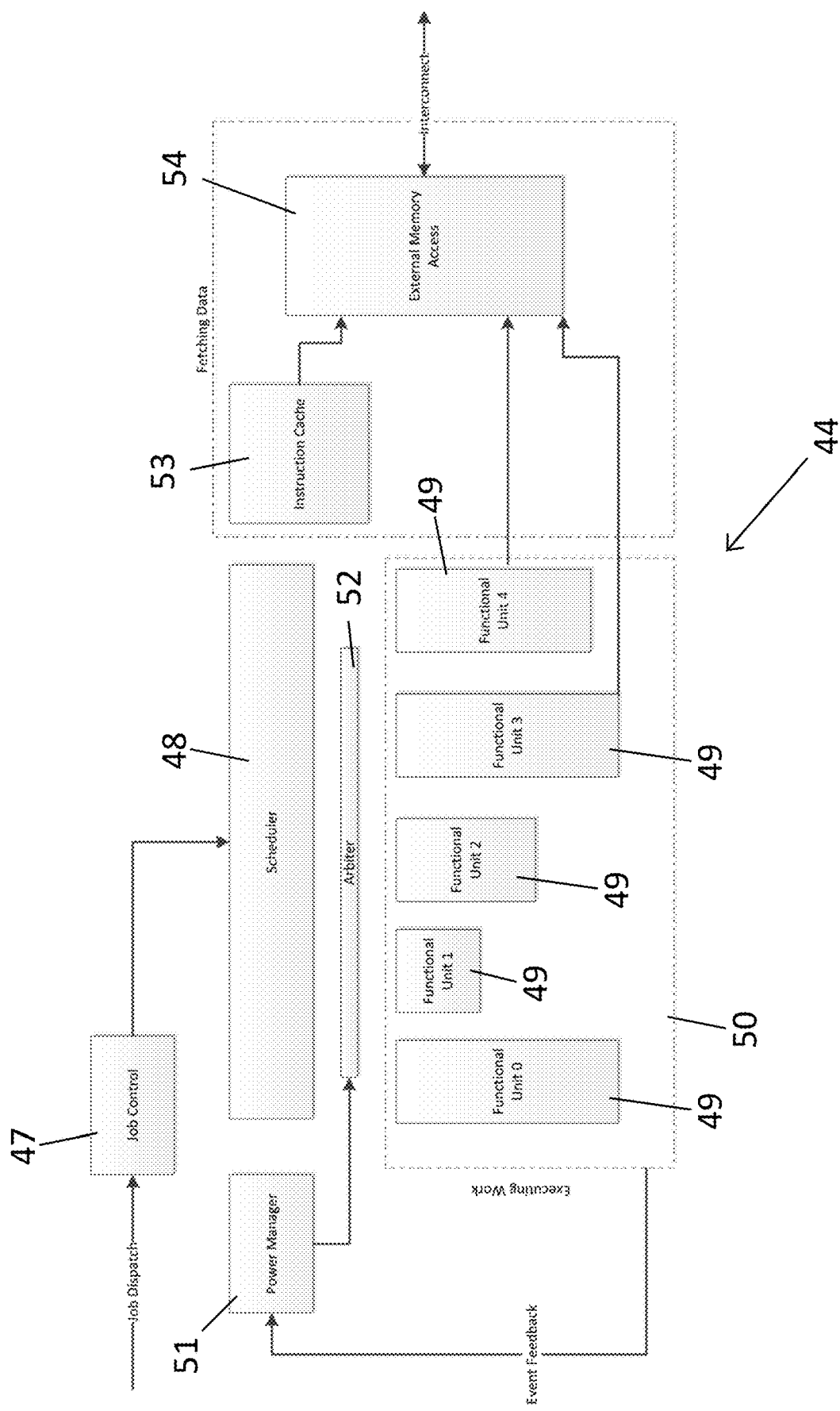
FIG. 5 shows schematically a processing engine of a graphics processing unit that can be operated in the manner of the technology described herein.

FIG. 5 shows schematically a processing engine 44 of a graphics processing unit (e.g. one of the processing engines 44 shown in FIG. 4). The processing engine 44 includes a job control unit 47 that receives jobs from the job dispatch unit 43 (as shown in FIG. 4), which are forwarded by the job control unit 47 to a scheduler 48. The job dispatch unit 43 is at the level of the graphics processing unit and oversees the issuing of jobs to the job dispatch unit 43 of individual processing engines 44.

The scheduler 48 receives the job instructions and, based on these, organises (e.g. orders and prioritises) execution threads for issuing to the functional units 49 of a core 50 of the processing engine 44 for execution. Execution threads will be issued to appropriate functional units 49, such as arithmetic processing units, to perform the processing operations required by the shader program in question.

The processing engine 44 also includes an energy manager ("Power Manager") 51 that receives feedback about the number and type of instructions that are being executed by the functional units 49 for the execution threads. The energy manager 51 uses this feedback information to control the issuing of instructions from the scheduler 48, via an arbiter 52, to the functional units 49.

The processing engine 44 further includes an instruction cache 53 (that stores the instructions for executing by the functional units 49), with which the functional units 49 are in communication via an external memory access unit 54, such that they can fetch the necessary instructions for execution when they are required for an execution thread. The external memory access unit 54 also provides communication for the functional units 49 to the external memory via an interconnect, e.g. the interconnect 46 shown in FIG. 4.

Although only one execution core 50 has been shown in FIG. 5, a processing engine 44 may include multiple execution cores. Furthermore, execution threads may be organised into groups ("warps") of threads that are to be run in lockstep, one instruction at a time, when executing a shader program. A configuration with multiple execution cores for executing warps is shown in FIG. 6.

Figure 6:
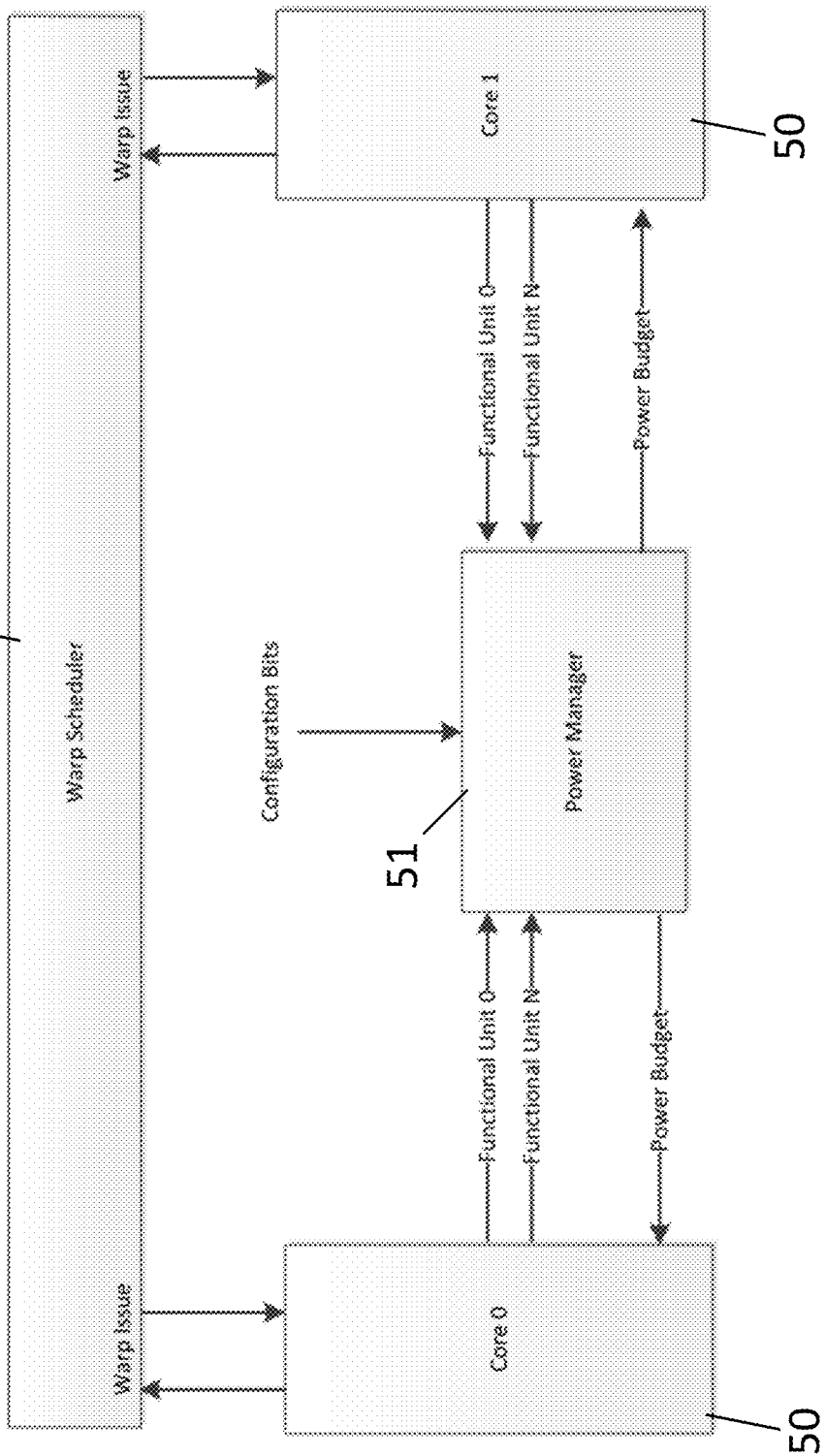
FIG. 6 shows schematically the interactions between a scheduler, an energy manager and two execution cores of a processing engine, according to an embodiment of the technology described herein.

FIG. 6 shows schematically the interactions between the (warp) scheduler 48, the energy manager 51 and two execution cores 50 of a processing engine 44 (e.g. as shown in FIG. 5), according to an embodiment of the technology described herein. In the same manner as in FIG. 5, the (warp) scheduler 48 shown in FIG. 6 is arranged to issue (groups ("warps") of) threads to execution cores 50 for the functional units 49 of the cores 50 to execute shader programs for the threads.

As shown in FIG. 6, the functional units 49 communicate with the energy manager 51, to inform the energy manager 51 of the number and type of instructions that are being executed by the functional units 49. In return, the energy manager 51 uses this feedback information to issue an energy budget "Power Budget" (the permitted energy usage range by the execution cores 50 in the next time period) back to the execution cores 50. This energy budget is used (e.g. by the arbiter 52 as shown in FIG. 5) to control the issuing of instructions from the scheduler 48 to the functional units 49, such that the execution of these instructions causes the energy usage of the execution cores 50 to remain within the energy budget, as will be described below.

FIG. 6 also shows that configuration bits (e.g. issued by the driver 4 as shown in FIG. 1) are used to set operational parameters for the energy manager 51, e.g. the time period for which the energy budget is issued, the permitted change in the energy budget between time periods and the energy usage weights for different instruction types.

Figure 7:
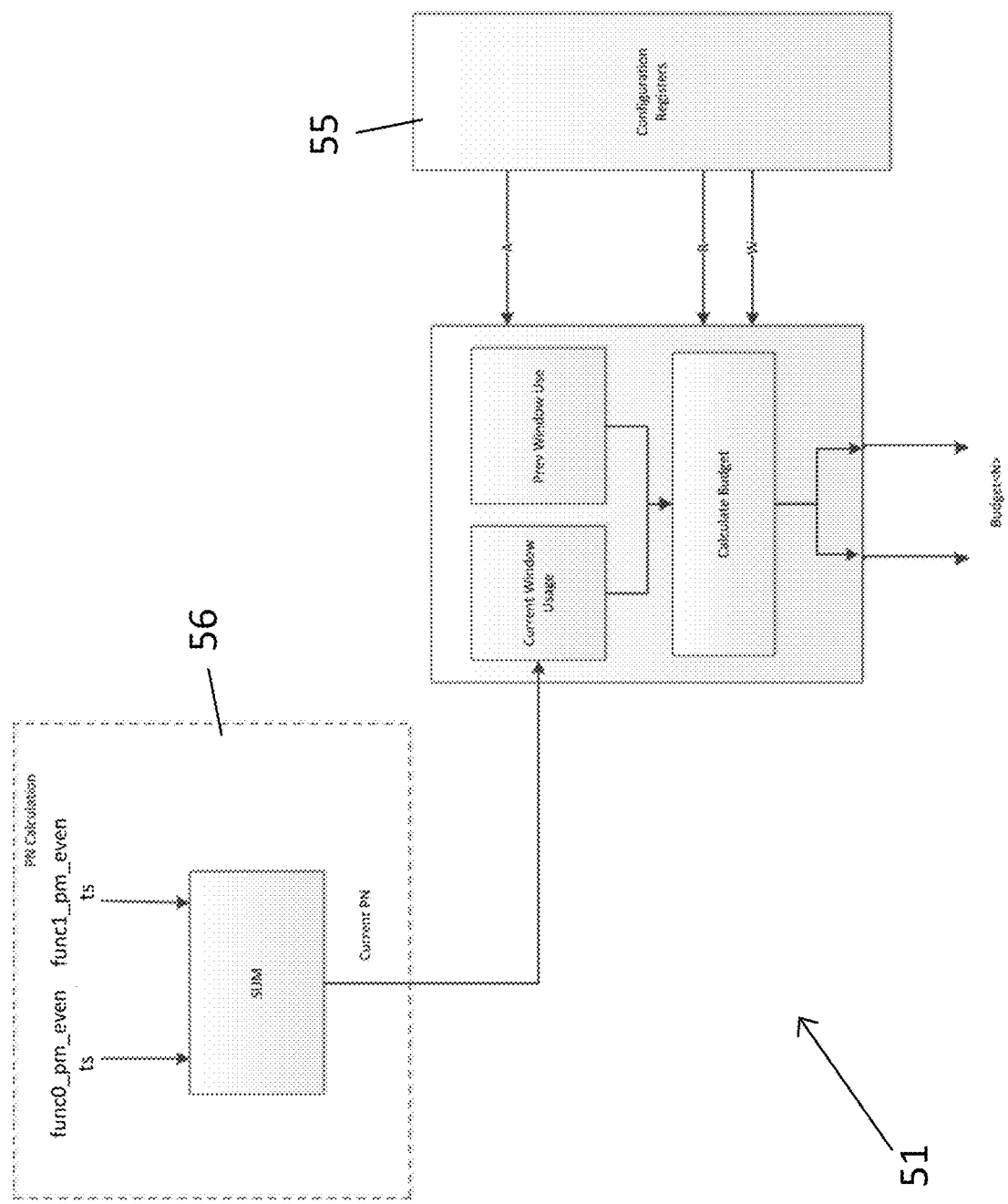
FIG. 7 shows schematically an energy manager according to an embodiment of the technology described herein.

FIG. 7 shows the internal arrangement of the energy manager 51 shown in FIGS. 5 and 6, according to an embodiment of the technology described herein. The energy manager includes configuration registers 55 to store the configuration bits that are provided to the energy manager 51 (as shown in FIG. 6).

The energy manager 51 includes a calculation module 56 that calculates the current energy usage of the execution cores 50. When the current time period ("window") has finished, this is stored by the energy manager 51 as the energy usage for the previous window. The previous window energy usage is used, along with the configuration bits, to set the energy budget for the next (current) time period. The current energy usage is used by the energy manager 51 to determine how this compares to the energy budget (and whether any action needs to be taken to retain the current energy usage within the energy budget), as the execution cores 50 work their way through the instructions to execute in the next (current) time period.

Figure 8:
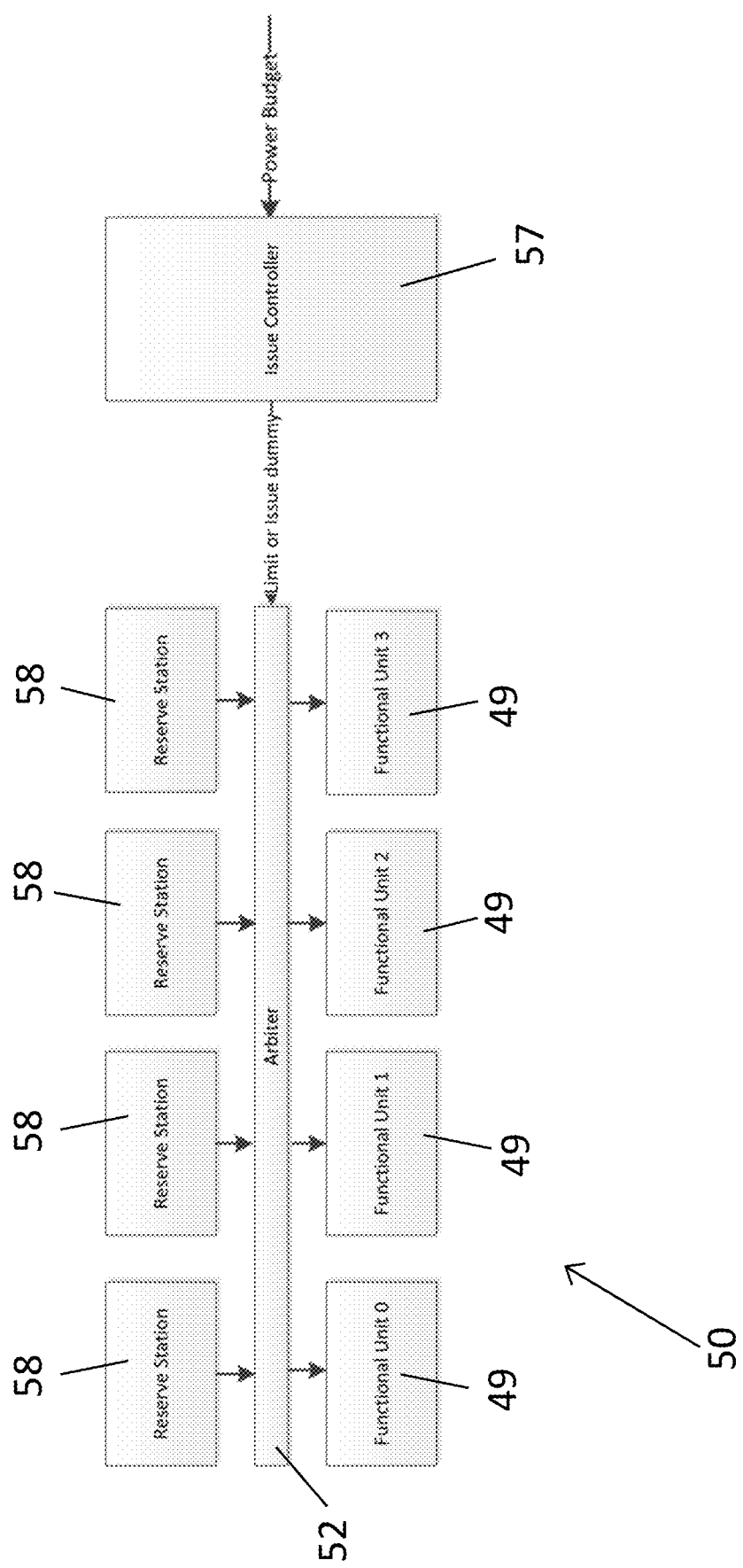
FIG. 8 shows an issue controller and multiple functional units in an execution core, according to an embodiment of the technology described herein.

FIG. 8 shows the arrangement of functional units 49 in an execution core 50, according to an embodiment of the technology described herein. The execution core 50 includes an issue controller 57 that receives the energy budget from the energy manager 51. The issue controller 57 is connected to the arbiter 52 and issues commands for limiting the instructions to be executed in a time period, or the "dummy" instructions to be executed, to the arbiter 52.

Each of the functional units 49 in the execution core 50 has an associated reserve station 58 to which instructions (and the data for executing the instructions) are issued by the issue controller 57 and then stored before being executed by the respective functional unit 49. The issue controller 57 is also arranged, based on the energy budget, to issue a limit (i.e. a maximum) for the number of instructions that the reserve stations 58 can issue for execution to the respective functional units 49, via the arbiter 52. Also based on the energy budget, the issue controller 57 is arranged to issue "supplementary" ("dummy") instructions to the functional units 49, again via the arbiter 52, should there be too few instructions in the reserve stations 58 to execute to retain the energy usage of the functional units 49 above the minimum limit of the energy budget.

Figure 9:
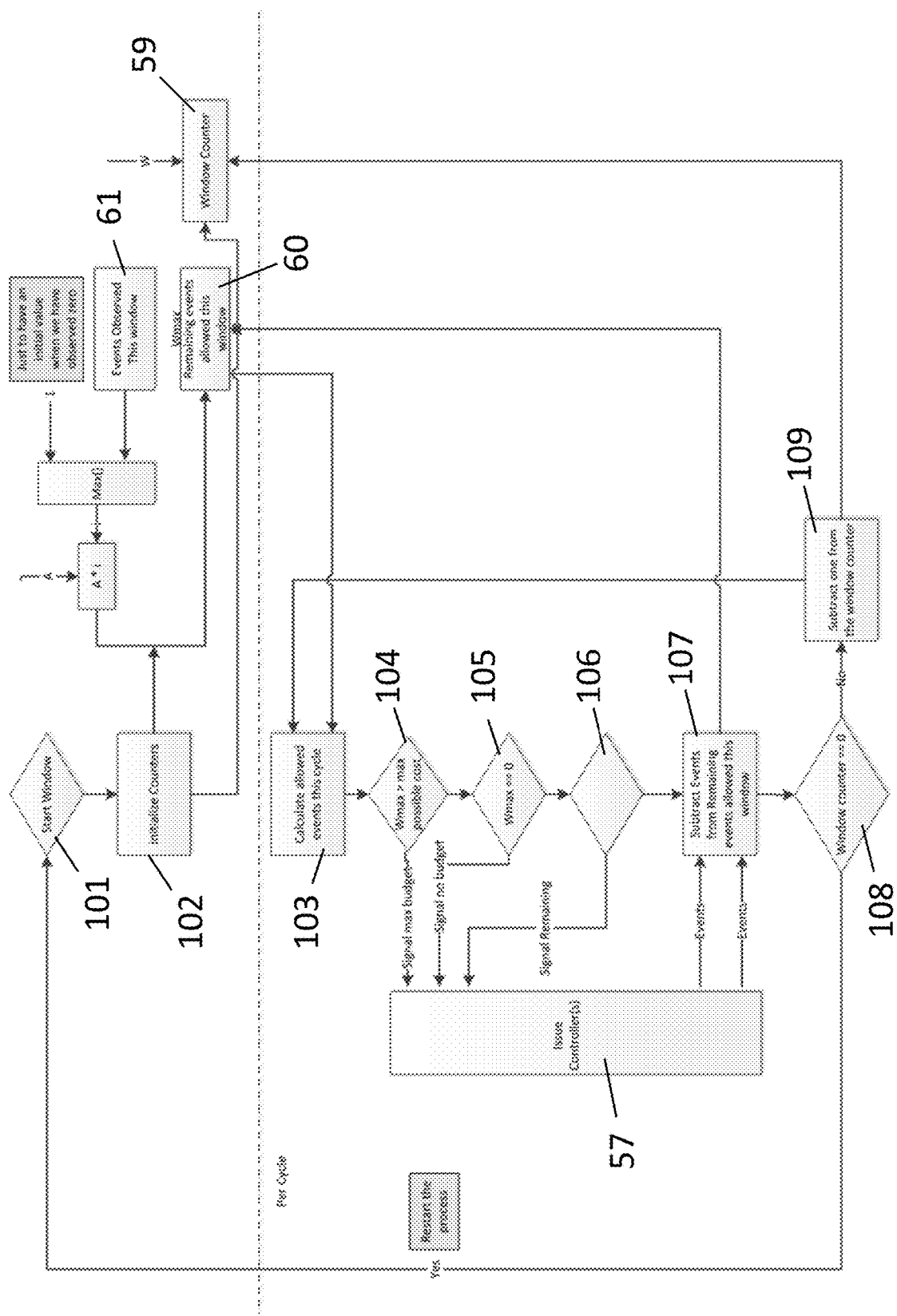
FIG. 9 shows a flow chart of the overall operation of a graphics processing unit, according to an embodiment of the technology described herein.
Figure 10:
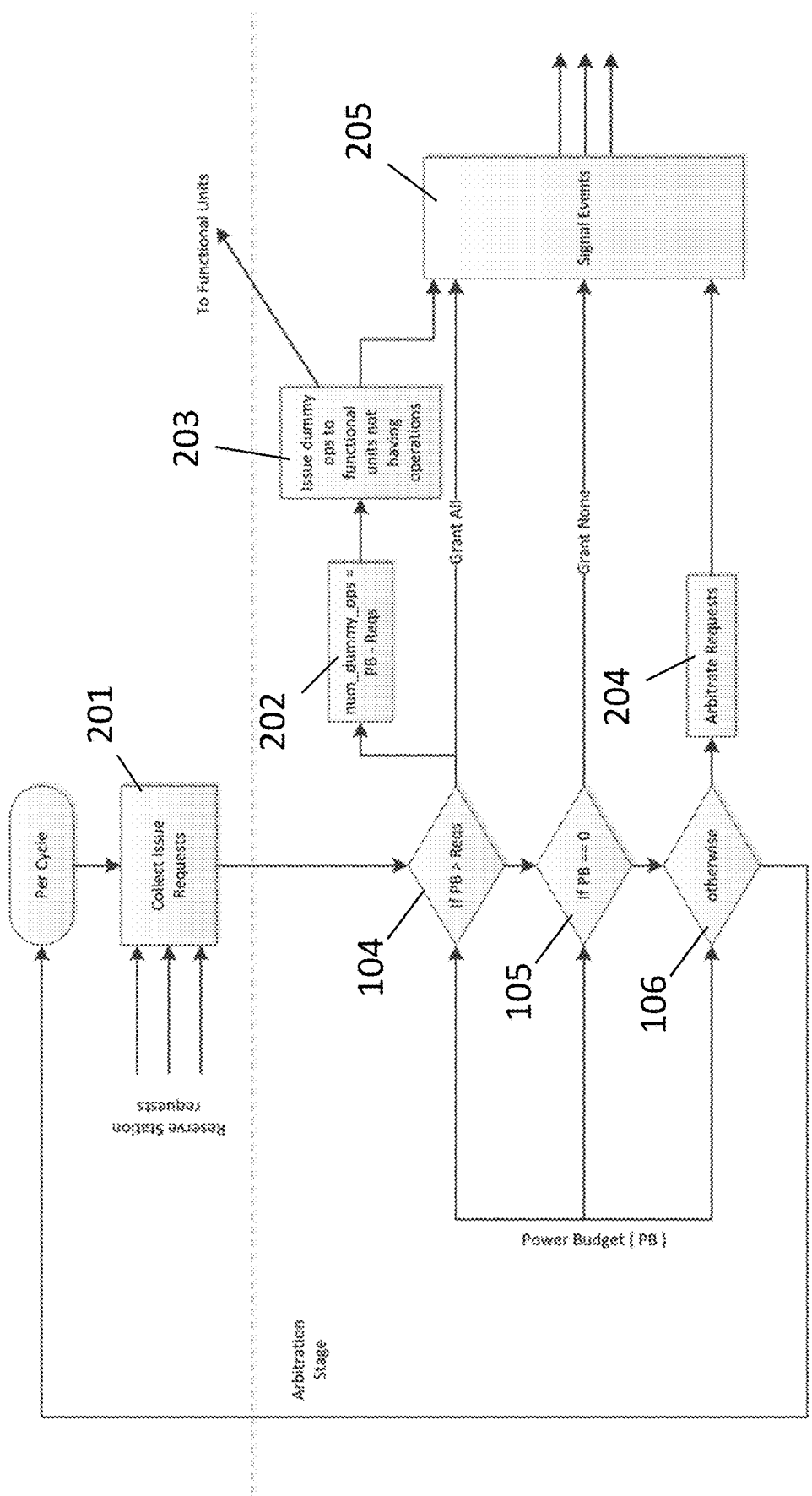
FIG. 10 shows a flow chart of the energy management of a graphics processing unit, according to an embodiment of the technology described herein.
Figure 11:
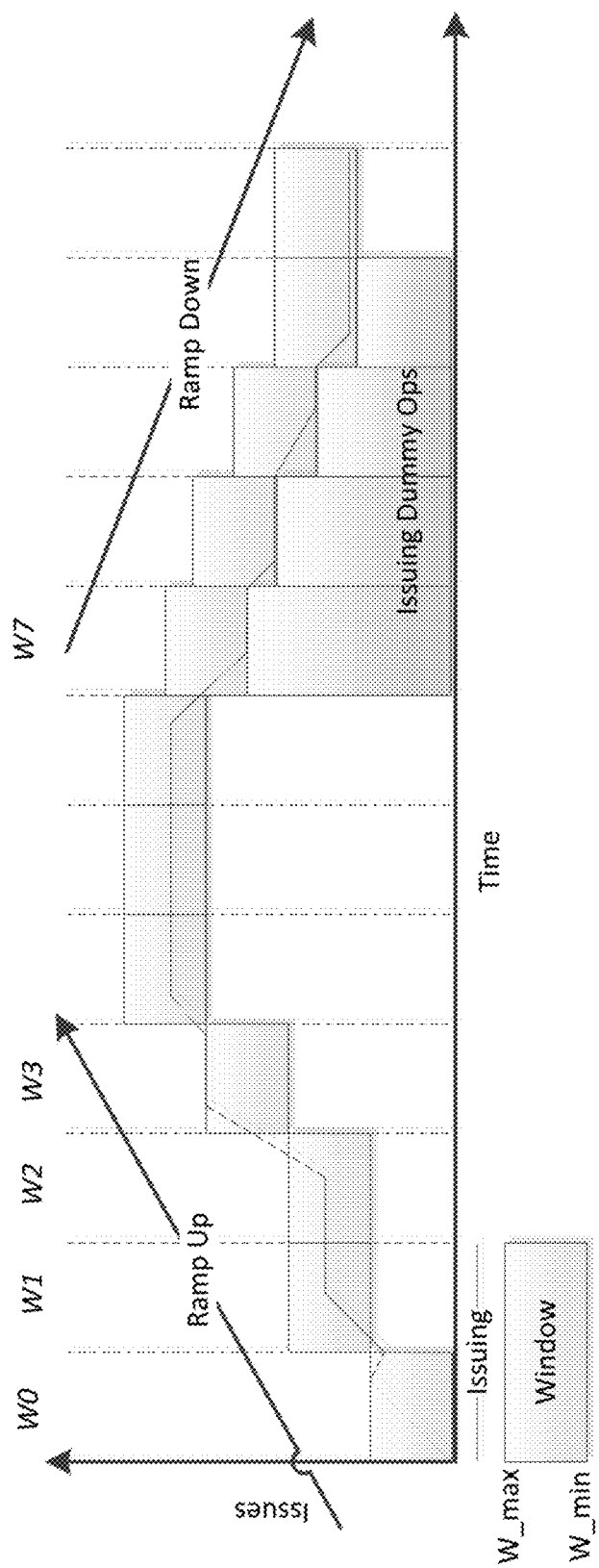
FIG. 11 shows a graph of the energy usage of a graphics processing unit, when being operated in accordance with an embodiment of the technology described herein.

Operation of the graphics processing unit and system shown in FIGS. 1-8 will now be described with reference to FIGS. 9-11. FIG. 9 shows a flow chart of the overall operation of the graphics processing unit when issuing and executing instructions, according to an embodiment of the technology described herein. FIG. 10 shows a flow chart of the energy management of a graphics processing unit when issuing instructions for execution, according to an embodiment of the technology described herein. FIG. 11 shows a graph of the effect of the operation of the energy management of the graphics processing unit, according to an embodiment of the technology described herein, on its energy usage.

FIG. 9 illustrates the operation of the graphics processing unit 3 in a time period (window) over which instructions are issued for execution, executed and their energy usage monitored. This energy usage is monitored and then used to control the issuing of instructions in the next time period to limit the change in the energy usage of the graphics processing unit 3 from the energy usage in the current time period.

At the start of a window (step 101, FIG. 9), the various counters that are to be used in the monitoring and control of the energy usage for instructions issued for execution are initialised (step 102, FIG. 9). This includes a window counter 59 of the energy manager 51 which monitors the length (time period) of the window over which the instructions are issued for execution, executed and their energy usage monitored. The duration of the window, W (a number of execution cycles), is set as a configuration bit in the configuration registers 55 of the energy manager 51 (as shown in FIGS. 6 and 7). Thus, when the window counter 59 is initialised at the beginning of a window, the counter is set to the value W.

The counter 60 for the maximum remaining number of events (executions of instructions) for the window, $W_{max}$ (the maximum limit of the energy budget calculated by the energy manager 51), is also initialised. $W_{max}$ is initialised to the number of events that have been monitored to have been executed in the previous window 61 (as determined by the calculation module 56 of the energy manager 51), scaled by a factor equal to the integer part of A (the permitted increase in the energy usage from one window to the next), as long as this is not zero (when $W_{max}$ is assigned the value equal to the integer part of A). This gives a maximum for the number of events that are permitted to be executed in the next time window, to satisfy the energy budget.

The execution cores 50 of the processing engines 44 of the graphics processing unit 3 execute the scheduled instructions in execution cycles (e.g. at the clock frequency of the execution cores 50), for a defined number of execution cycles in each window, which is set by the duration of the window, W.

In the first execution cycle of the window, the maximum number of events allowed to be executed in this cycle is calculated by the energy manager 51, using the value of $W_{max}$, e.g. by dividing the maximum number of events for the window ($W_{max}$) by the number of execution cycles in the window (e.g. taking the value from the window counter 59). The energy manager 51 also calculates the maximum possible energy usage cost of the instructions scheduled to be executed, which may simply be the number of instructions (step 103, FIG. 9).

If the maximum number of instructions allowed to be executed in this cycle is greater than the number of instructions scheduled to be executed, the energy manager 51 signals to the issue controller(s) 57 of the execution cores 50 that they have the maximum energy budget allocated to them and are thus allowed to grant all requests for instructions to be executed (step 104, FIG. 9).

Otherwise, when the number of instructions allowed to be executed in this cycle is less than the number of instructions scheduled to be executed, the energy manager 51 signals to the issue controller(s) 57 of the execution cores 50 the remaining energy budget that is allocated to them for the window (which, for the first execution cycle of a window, is equal to maximum number of instructions allowed to be executed in this cycle ($W_{max}$)) (step 106, FIG. 9). As shown in FIG. 8, the issue controller 57 passes this limit (the remaining energy budget shared between the functional units 49) onto the reserve stations 58 for controlling the issue of instructions to the functional units 49, so that the combined energy usage of the functional units 49 is kept within the remaining energy budget.

For the instructions ("events") that are executed in the first execution cycle, the functional units 49 report back the number of instructions they each executed to the issue controller(s) 57, which in turn reports these numbers back to the energy manager 51. The calculation module 56 of the energy manager 51 sums these numbers and the energy manager 51 then subtracts this total from the maximum number of instructions allowed to be executed in the window (step 107, FIG. 9). The counter 60 is then updated with the maximum remaining number of instructions that are permitted to be executed in the window.

When the window counter 59 is not equal to zero and thus there are still further execution cycles in the window (step 108, FIG. 9), the window counter is reduced by one (step 109, FIG. 9) and the same process is repeated for the next execution cycle in the window.

Thus, in subsequent execution cycles, the maximum number of events allowed to be executed in this cycle is calculated by the energy manager 51, using the value of $W_{max}$ that is remaining for the window, e.g. by dividing the maximum remaining number of events for the window ($W_{max}$) by the number of execution cycles remaining in the window (e.g. taking the value from the window counter 59). The energy manager 51 also calculates the maximum possible energy usage cost of the instructions scheduled to be executed, which may simply be the number of instructions (step 103, FIG. 9).

If the maximum number of instructions allowed to be executed in this cycle is greater than the number of instructions scheduled to be executed, the energy manager 51 signals to the issue controller(s) 57 of the execution cores 50 that they have the maximum energy budget allocated to them and are thus allowed to grant all requests for instructions to be executed (step 104, FIG. 9).

If the number of instructions allowed to be executed in this execution cycle is zero (e.g. owing to instructions amounting to the maximum limit of the permitted energy usage (the energy budget or "Power Budget") having been executed in previous execution cycles in the window), the energy manager 51 signals to the issue controller(s) 57 of the execution cores 50 that they have no remaining budget and thus cannot execute any further instructions that may be scheduled (step 105, FIG. 9).

Otherwise, when the number of instructions allowed to be executed in this cycle is less than the number of instructions scheduled to be executed, the energy manager 51 signals to the issue controller(s) 57 of the execution cores 50 the remaining energy budget that is allocated to them for the window (step 106, FIG. 9). As shown in FIG. 8, the issue controller 57 passes this limit (the remaining energy budget shared between the functional units 49) onto the reserve stations 58 for controlling the issue of instructions to the functional units 49, so that the combined energy usage of the functional units 49 is kept within the remaining energy budget.

For the instructions ("events") that are executed in the execution cycle, the functional units 49 report back the number of instructions they each executed to the issue controller(s) 57, which in turn reports these numbers back to the energy manager 51. The calculation module 56 of the energy manager 51 sums these numbers and the energy manager 51 then subtracts this total from the maximum remaining number of instructions allowed to be executed in the window (step 107, FIG. 9). The counter 60 is then updated with the remaining maximum number of instructions that are permitted to be executed in the window.

When the window counter 59 is not equal to zero and thus there are still further execution cycles in the window (step 108, FIG. 9), the window counter is reduced by one (step 109, FIG. 9) and the same process is repeated for the next execution cycle in the window.

When the window counter 59 is equal to zero and thus there are no further execution cycles in the window (step 108, FIG. 9), the whole process for a window is restarted for the next window (step 101, FIG. 9). Thus, first the counters are (re-)initialised (step 102, FIG. 9).

The counter 60 for the maximum remaining number of events (executions of instructions) for the window, $W_{max}$, is initialised to the number of events that have been monitored to have been executed in the previous window 61 (as determined by the calculation module 56 of the energy manager 51), scaled by a factor equal to the integer part of A (the permitted increase in the energy usage from one window to the next), as long as this is not zero (when $W_{max}$ is assigned the value equal to the integer part of A). This gives a maximum for the number of events that are permitted to be executed in the next time window, to satisfy the energy budget. The issue of instructions for execution in this next time window is thus controlled by the energy manager using this new value of $W_{max}$, in the manner described above.

The process of controlling the issuing of instructions to the functional units 49 by the issue controller(s) 57, based on the control from the energy manager 51 (according to the steps shown in FIG. 9), is shown in FIG. 10. For each execution cycle of the window, the issue controller(s) 57 collect the number of instructions scheduled (desired to be executed) and requested to be issued by the reserve stations 58 to the respective functional units (step 201, FIG. 10). This is equivalent to the step shown in FIG. 9 when the maximum possible energy usage cost of the instructions scheduled to be executed is calculated (step 103, FIG. 9).

Using the energy budget that has been calculated by the energy manager 51, as explained with reference to FIG. 9, the energy manager 51 then compares this estimated energy usage (the number of requested instructions in the reserve stations 58) to the allowed energy usage for the execution cycle, in the same manner as is shown in FIG. 9. When the maximum number of instructions allowed to be executed in this cycle is greater than the number of instructions scheduled to be executed, the energy manager 51 signals to the issue controller(s) 57 of the execution cores 50 that they have the maximum energy budget allocated to them and are thus allowed to grant all requests for instructions to be executed (step 104, FIG. 10).

This scenario is shown, for example, in windows W1, W2 and W4-W11 of the plot shown in FIG. 12, when the energy usage of the instructions scheduled to be issued in a window is less than the maximum limit of the energy budget.

When the energy budget is greater than the predicted energy usage of the scheduled instructions, it will be seen that there is no risk that the energy usage of the instructions will exceed the maximum limit of the energy budget. However, there may not be sufficient scheduled instructions to cause the energy usage to be above the minimum limit of the energy budget. When this is the case (step 202, FIG. 10), the energy manager 51 controls the issue controller(s) 57 to issue "supplementary" instructions to the functional units 49 for execution (step 203, FIG. 10), as shown in FIG. 8. The execution of these "supplementary" instructions retains the energy usage of the execution cores 50 above the minimum limit of the energy budget.

This scenario is shown, for example, in windows W7-W10 of the plot shown in FIG. 12, when the energy usage of the instructions scheduled to be issued is not sufficient to meet the lower limit of the energy budget. Supplementary instructions are thus issued to be executed to retain the energy usage in these windows above the lower limit of the energy budget.

In the same way as shown in FIG. 9, when the number of instructions allowed to be executed in this execution cycle is zero, the energy manager 51 signals to the issue controller(s) 57 of the execution cores 50 that they have no remaining budget and thus cannot execute any further instructions that may be scheduled (step 105, FIG. 10).

When the number of instructions allowed to be executed in this cycle is less than the number of instructions scheduled to be executed, the energy manager 51 signals to the issue controller(s) 57 of the execution cores 50 the remaining energy budget that is allocated to them for the window (step 106, FIG. 10). In order to implement this energy budget (i.e. the maximum limit of the permitted energy usage in the window), the energy manager 51 arbitrates between the requests for instructions to be executed in the window (step 204, FIG. 10).

For example, the energy manager 51 may control the issue controller(s) 57 to issue instructions (up to the limit set by the energy budget) simply in the order in which they have been scheduled initially. The energy manager 51 may, for example, control the issue controller(s) 57 to issue instructions according to a priority that has been assigned to the scheduled instructions. The priority of the instructions may, for example, depend on the length of time they have been waiting to be issued and/or the importance of the instructions being executed to the shader program being executed. Using these arbitration mechanisms, the energy manager 51 limits the number of instructions that the issue controller(s) 57 issue during the window.

This scenario is shown in windows W0 and W3 of the plot shown in FIG. 12. In these windows, the energy usage of the instructions issued for execution reaches the upper limit of the energy budget before the end of the window. The energy manager 51 therefore acts to control the issue controller(s) 57 to limit the number of instructions issued during the window, so that the energy usage does not exceed the upper limit of the energy budget.

As shown in FIGS. 9 and 10, the functional units 49 then report back the number of instructions they each executed to the issue controller(s) 57 (step 205, FIG. 10), so that the energy manager 51 can monitor the energy usage during the window. The energy manager 51 uses this monitoring of the energy usage to set the energy budget for the next window.

This process is repeated for each execution cycle in the window and then for each window during operation of the graphics processing unit 3.

A number of variations, modifications and alternatives to the above described embodiments of the technology described herein would be possible, when desired. For example, the energy usage of the instructions when executed may not be equal and this may be taken into account when monitoring the energy usage and controlling the issue of instructions, e.g. by weighting different instruction types according to their energy usage.

As can be seen from the above, the technology described herein, in its embodiments at least, comprises an improved mechanism for managing the energy usage of a graphics processing unit. This is achieved, in the embodiments of the technology described herein at least, by monitoring the energy usage when the execution processing circuitry of the graphics processing unit is executing instructions in one time period and using this to set a permitted energy usage range in the next time period. The permitted energy usage range is then used to control the issuing of instructions for execution in the next time period, which controls the energy usage and helps to prevent large changes in the energy usage over time. This helps to provide more certainty for the energy management of the graphics processing unit.

The foregoing detailed description has been presented for the purposes of illustration and description. It is not intended to be exhaustive or to limit the invention to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A graphics processing unit operable to execute graphics processing programs comprising sequences of instructions to perform graphics processing operations;

the graphics processing unit comprising:

execution processing circuitry operable to execute instructions to perform graphics processing operations;

instruction issuing circuitry operable to issue instructions to be executed to the execution processing circuitry; and energy management circuitry operable to:
monitor the energy usage by the execution processing circuitry when executing instructions;
determine, based on the monitoring of the energy usage, a permitted energy usage range for the execution processing circuitry when executing instructions for a future time period;
control the energy usage by the execution processing circuitry, when executing instructions in the future time period, by the energy management circuitry controlling the instruction issuing circuitry to issue instructions to the execution processing circuitry during the future time period based on the permitted energy usage range determined for the future time period; and
control the energy usage by the execution processing circuitry, when executing instructions in the future time period, by the energy management circuitry controlling the instruction issuing circuitry to issue supplementary instructions to the execution processing circuitry during the future time period for execution to prevent the energy usage in the future time period from being below a lower limit of the permitted energy usage range;
wherein the supplementary instructions are not part of the sequence of instructions to perform graphics processing operations for the execution of the graphics processing program; and
wherein the supplementary instructions are issued in addition to the sequence of instructions to perform graphics processing operations for the execution of the graphics processing program.

2. The graphics processing unit as claimed in claim 1, wherein the energy management circuitry is operable to monitor the energy usage by monitoring the issuing of instructions by the instruction issuing circuitry to the execution processing circuitry.

3. The graphics processing unit as claimed in claim 2, wherein the energy management circuitry is operable to monitor the energy usage by monitoring the issuing of instructions weighted by their energy usage.

4. The graphics processing unit as claimed in claim 1, wherein the energy management circuitry is operable to:
monitor the energy usage by the execution processing when executing instructions in a current time period;
determine, based on the monitoring of the energy usage, a permitted energy usage range for the execution processing circuitry when executing instructions for a future time period, wherein the future time period is the next time period after the current time period; and
control the issuing of instructions to the execution processing circuitry by the instruction issuing circuitry during the next time period based on the permitted energy usage range determined for the next time period.

5. The graphics processing unit as claimed in claim 1, wherein the energy management circuitry is operable to determine the permitted energy usage range using a permitted energy usage change for the future time period from the monitored energy usage, wherein the permitted energy usage change is based on the monitored energy usage.

6. The graphics processing unit as claimed in claim 5, wherein the permitted energy usage range is determined using the permitted energy usage change and the monitored energy usage, by determining a permitted minimum energy usage and a permitted maximum energy usage for the future time period, which thereby define the permitted energy usage range.

7. The graphics processing unit as claimed in claim 1, wherein the energy management circuitry is operable to determine an expected energy usage for instructions that are scheduled to be issued in the future time period, and to use the determined expected energy usage for the instructions scheduled to be issued to control the issuing of the instructions to the execution processing circuitry by the instruction issuing circuitry during the future time period.

8. The graphics processing unit as claimed in claim 1, wherein the energy management circuitry is operable to control the instruction issuing circuitry to issue instructions to the execution processing circuitry during the future time period until the expected energy usage of the issued instructions reaches an upper limit of the permitted energy usage range for the future time period.

9. The graphics processing unit as claimed in claim 1, wherein the future time period comprises a plurality of time intervals; and
wherein the energy management circuitry is operable to:
distribute the permitted energy usage range over the plurality of time intervals of the future time period; and
control the issue of instructions during each of the plurality of time intervals based on the distributed permitted energy usage range for that time interval.

10. A method of operating a graphics processing unit for executing graphics processing programs comprising sequences of instructions to perform graphics processing operations;
wherein the graphics processing unit comprises execution processing circuitry operable to execute instructions to perform graphics processing operations;
wherein the method comprises:
issuing instructions to be executed to the execution processing circuitry;
monitoring the energy usage by the execution processing circuitry when executing the instructions;
determining, based on the monitoring of the energy usage, a permitted energy usage range for the execution processing circuitry when executing instructions for a future time period;
controlling the energy usage by the execution processing circuitry, when executing instructions in the future time period, by controlling the issuing of instructions to the execution processing circuitry during the future time period based on the permitted energy usage range determined for the future time period; and
controlling the energy usage by the execution processing circuitry, when executing instructions in the future time period, by the energy management circuitry controlling the instruction issuing circuitry to issue supplementary instructions to the execution processing circuitry during the future time period for execution to prevent the energy usage in the future time period from being below a lower limit of the permitted energy usage range;
wherein the supplementary instructions are not part of the sequence of instructions to perform graphics processing operations for the execution of the graphics processing program; and
wherein the supplementary instructions are issued in addition to the sequence of instructions to perform graphics processing operations for the execution of the graphics processing program.

11. The method as claimed in claim 10, wherein the step of monitoring the energy usage comprises monitoring the issuing of instructions by the instruction issuing circuitry to the execution processing circuitry.

12. The method as claimed in claim 11, wherein the step of monitoring the energy usage comprises monitoring the energy usage by monitoring the issuing of instructions weighted by their energy usage.

13. The method as claimed in claim 10, wherein the method comprises
monitoring the energy usage by the execution processing when executing instructions in a current time period;
determining, based on the monitoring of the energy usage, a permitted energy usage range for the execution processing circuitry when executing instructions for a future time period, wherein the future time period is the next time period after the current time period; and
controlling the issuing of instructions to the execution processing circuitry during the next time period based on the permitted energy usage range determined for the next time period.

14. The method as claimed in claim 10, wherein the method comprises determining the permitted energy usage range using a permitted energy usage change for the future time period from the monitored energy usage, wherein the permitted energy usage change is based on the monitored energy usage.

15. The method as claimed in claim 14, wherein the method comprises determining the permitted energy usage range using the permitted energy usage change and the monitored energy usage, by determining a permitted minimum energy usage and a permitted maximum energy usage for the future time period, which thereby define the permitted energy usage range.

16. The method as claimed in claim 10, wherein the method comprises determining an expected energy usage for instructions that are scheduled to be issued in the future time period, and using the determined expected energy usage for the instructions scheduled to be issued to control the issuing of the instructions to the execution processing circuitry by the instruction issuing circuitry during the future time period.

17. The method as claimed in claim 10, wherein the method comprises issuing instructions to the execution processing circuitry during the future time period until the expected energy usage of the issued instructions reaches an upper limit of the permitted energy usage range for the future time period.

18. The method as claimed in claim 10, wherein the future time period comprises a plurality of time intervals, and the method comprises distributing the permitted energy usage range over the plurality of time intervals of the future time period, and controlling the issue of instructions during each of the plurality of time intervals based on the distributed permitted energy usage range for that time interval.

19. A non-transient computer readable storage medium storing computer software code which when executing on a data processing system comprising a graphics processing unit performs a method of operating the graphics processing unit for executing graphics processing programs comprising sequences of instructions to perform graphics processing operations;
wherein the graphics processing unit comprises execution processing circuitry operable to execute instructions to perform graphics processing operations;
wherein the method comprises:
issuing instructions to be executed to the execution processing circuitry;
monitoring the energy usage by the execution processing circuitry when executing the instructions;
determining, based on the monitoring of the energy usage, a permitted energy usage range for the execution processing circuitry when executing instructions for a future time period; and
controlling the energy usage by the execution processing circuitry, when executing instructions in the future time period, by controlling the issuing of instructions to the execution processing circuitry during the future time period based on the permitted energy usage range determined for the future time period; and
controlling the energy usage by the execution processing circuitry, when executing instructions in the future time period, by the energy management circuitry controlling the instruction issuing circuitry to issue supplementary instructions to the execution processing circuitry during the future time period for execution to prevent the energy usage in the future time period from being below a lower limit of the permitted energy usage range;
wherein the supplementary instructions are not part of the sequence of instructions to perform graphics processing operations for the execution of the graphics processing program; and
wherein the supplementary instructions are issued in addition to the sequence of instructions to perform graphics processing operations for the execution of the graphics processing program.

* * * * *